United States Patent
Rossbach et al.

(10) Patent No.: US 8,134,637 B2
(45) Date of Patent: Mar. 13, 2012

(54) METHOD AND SYSTEM TO INCREASE X-Y RESOLUTION IN A DEPTH (Z) CAMERA USING RED, BLUE, GREEN (RGB) SENSING

(75) Inventors: Christopher J. Rossbach, Austin, TX (US); Abbas Rafii, Palo Alto, CA (US); Peiqian Zhao, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 11/444,947

(22) Filed: Jun. 1, 2006

(65) Prior Publication Data

US 2006/0221250 A1    Oct. 5, 2006

Related U.S. Application Data

(63) Continuation-in-part of application No. 11/044,996, filed on Jan. 26, 2005.

(60) Provisional application No. 60/686,470, filed on Jun. 1, 2005.

(51) Int. Cl.
| | |
|---|---|
| *G03B 13/00* | (2006.01) |
| *H04N 9/07* | (2006.01) |
| *H04N 5/225* | (2006.01) |
| *H04N 13/02* | (2006.01) |
| *G01C 3/08* | (2006.01) |

(52) U.S. Cl. ......... 348/348; 348/49; 348/336; 348/342; 356/5.01; 356/5.04

(58) Field of Classification Search ............... 348/274, 348/275, 336, 337, 348, 349, 350, 42–60; 356/5.01–5.08

See application file for complete search history.

(56) References Cited

U.S. PATENT DOCUMENTS

| 5,920,347 | A | 7/1999 | Aoki | |
|---|---|---|---|---|
| 6,094,281 | A * | 7/2000 | Nakai et al. | 358/512 |
| 6,512,838 | B1 | 1/2003 | Rafii et al. | |
| 6,657,663 | B2 * | 12/2003 | Morris | 348/273 |
| 6,856,355 | B1 * | 2/2005 | Ray et al. | 348/370 |
| 6,915,196 | B2 | 7/2005 | Rao et al. | |
| 7,129,462 | B2 | 10/2006 | Hogan et al. | |
| 7,259,375 | B2 * | 8/2007 | Tichit et al. | 250/341.8 |
| 7,274,393 | B2 * | 9/2007 | Acharya | 348/273 |

(Continued)

OTHER PUBLICATIONS

Office Action dated Mar. 17, 2011, U.S. Appl. No. 11/044,996, filed Jan. 26, 2005.

(Continued)

*Primary Examiner* — David Ometz
*Assistant Examiner* — Dillon Durnford Geszvain
(74) *Attorney, Agent, or Firm* — Vierra Magen Marcus & DeNiro LLP

(57) ABSTRACT

An imaging system substantially simultaneously acquires z-depth and brightness data from first sensors, and acquires higher resolution RGB data from second sensors, and fuses data from the first and second sensors to model an RGBZ image whose resolution can be as high as resolution of the second sensors. Time correlation of captured data from first and second sensors is associated with captured image data, which permits arbitrary mapping between the two data sources, ranging from 1:many to many:1. Preferably pixels from each set of sensors that image the same target point are mapped. Many z-depth sensor settings may be used to create a static environmental model. Non-correlative and correlative filtering is carried out, and up-sampling to increase z-resolution occurs, from which a three-dimensional model is constructed using registration and calibration data.

20 Claims, 15 Drawing Sheets

U.S. PATENT DOCUMENTS 7,560,679 B1 * 7/2009 Gutierrez .................. 250/208.1
2004/0169749 A1 9/2004 Acharya
2004/0183940 A1 9/2004 Raskar

OTHER PUBLICATIONS

Response to Office Action dated Jun. 17, 2011, U.S. Appl. No. 11/044,996, filed Jan. 26, 2005.
Office Action dated Jun. 20, 2011, U.S. Appl. No. 12/004,305, filed Dec. 20, 2007.
Response to Office Action dated Oct. 13, 2011, U.S. Appl. No. 12/004,305, filed Dec. 20, 2007.
Notice of Allowance and Fee(s) Due dated Jan. 5, 2012, U.S. Appl. No. 11/044,996 filed Jan. 26, 2005.
Notice of Allowance and Fee(s) Due dated Jan. 12, 2012, U.S. Appl. No. 11/004,305 filed Dec. 20, 2007.

* cited by examiner

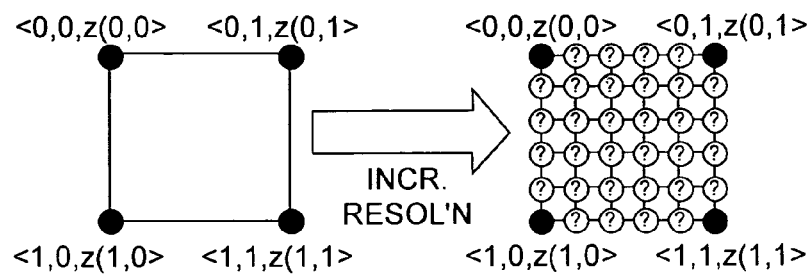
FIG. 16
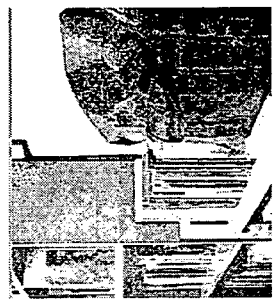
FIG. 17A
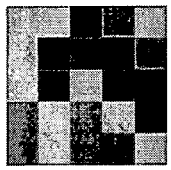 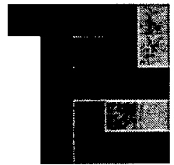 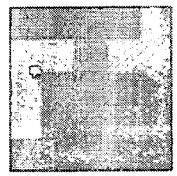
FIG. 17B  FIG. 17C  FIG. 17D
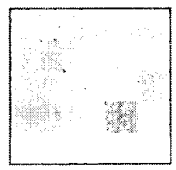 
FIG. 17E  FIG. 17F

METHOD AND SYSTEM TO INCREASE X-Y RESOLUTION IN A DEPTH (Z) CAMERA USING RED, BLUE, GREEN (RGB) SENSING

CROSS-REFERENCE TO CO-PENDING RELATED APPLICATIONS

This application claims priority to co-pending U.S. provisional patent application Ser. No. 60/686,470 filed 1 Jun. 2005 entitled RGBZ: Increasing X-Y Resolution of a Depth Camera Using an Ordinary Video Camera, and is also a continuation-in-part from co-pending U.S. patent application Ser. No. 11/044,996 filed 26 Jan. 2005 entitled Single Chip Red, Green, Blue, Distance (RGB-Z) Sensor, which application itself claimed priority from U.S. provisional patent application Ser. No. 60/540,523 filed 26 Jan. 2004 entitled Single Chip RGBZ Sensor.

BACKGROUND OF THE INVENTION

1. Field of the Invention

The invention relates generally to images acquired with sensors (including sensors implementable on a single integrated circuit chip) responsive to luminosity information in a first spectral band (such as red, green, blue optical wavelengths, which shall be understood to include black and white) to acquire an red-green-blue (RGB) image, and responsive to wavelengths in a second spectral band, preferably near-infrared (NIR), to acquire Z data, and more particularly to improving resolution of such images.

2. Description of Related Art

Luminosity-based sensors including CMOS-implementable sensors are known in the art. Such sensors commonly include an array of pixel detectors responsive to wavelengths in a first spectral band, e.g., red, green, blue (RGB) wavelengths, which shall be understood to include black and white (RGB sensors) or simply gray scale wavelengths (black and white or BW sensors). The array can be fabricated upon an integrated circuit (IC) substrate upon which may be fabricated analog-to-digital conversion circuitry and signal processing circuitry. While such luminosity based sensors can provide a color (RGB) or gray scale (BW) image, they provide no useful depth information.

FIG. 1A depicts an exemplary application of a conventional RGB or BW sensor. Suppose that it is desired to use a camera system to intelligently recognize objects within a field of view. In some applications the camera system might be provided in or on a motor vehicle to scan the road ahead for target objects that might be endangered by the motor vehicle, pedestrians perhaps. An exemplary camera system 5 includes a lens 10 that receives red, green, and blue components of visible light energy 15 reflected from a target object 20 a distance Z away from the camera system. Associated with the camera system is a prior art RGB sensor array 25 that outputs a signal responsive to the incoming RGB light components. Resolution of RGB sensor array 25 is a function of sensor area. A typical sensor array 25 may comprise more than a million pixels, each pixel being fairly small in area, perhaps less than 5 µm·5 µm. RGB sensors of at least 1 MP (megapixel) area are relatively inexpensive to mass produce because of the small size of the individual pixels. In FIG. 1A, sensor circuit 30 receives an output signal from sensor 25 and attempts to identify the target object 20 in terms of hazard potential. If desired, output from the camera system may include an image 35 electronically generated, for example on a flat screen monitor screen (or in some applications printed on media such as paper). In a hazard warning application, image 35 might be displayed within a red circle to designate an immediate hazard to be avoided, and sensor circuit 60 may also cause audible warnings to be sounded.

Although resolution of RGB sensor 25 may be adequate to display target object 20, rapid identification of the nature and size of the target would be improved if Z data, usually acquired from IR wavelengths, could also be used. Such information, if available, could also be used to provide a measure of the actual size of the target object.

It is also known in the art to fabricate range-finding or three-dimensional sensors using an array of pixel detectors, e.g., U.S. Pat. No. 6,323,942 (2001) entitled CMOS-Compatible Three-Dimensional Image Sensor IC, U.S. Pat. No. 6,515,740 (2003) entitled Methods for CMOS-Compatible Three-Dimensional Imaging Sensing Using Quantum Efficiency Modulation (2003) and U.S. Pat. No. 6,580,496 (2003) entitled Systems for CMOS-Compatible Three-Dimensional Imaging Sensing Using Quantum Efficiency Modulation. These three patents are assigned to assignee herein Canesta, Inc., now of Sunnyvale, Calif. These patents disclose sensor systems that provide depth information (Z-distance between the sensor and a target object) at each pixel detector in the sensor array for each frame of acquired data. Z-range-finding detectors according to the '942 patent determine range z by measuring time-of-flight (TOF) between emission of pulsed optical energy and detection of target object reflected optical energy. Z-range-finding systems according to the '740 and '496 patents operate somewhat similarly but detect phase shift between emitted and reflected-detected optical energy to determine z-range. Detection of the reflected optical energy signals over multiple locations in the pixel array results in measurement signals that are referred to as depth images.

FIG. 1B is taken from the '740 and '496 patents and depicts a phase-shift TOF system 40 fabricated on an IC 45 that includes a two-dimensional array 55 of pixel detectors 60, each of which has dedicated circuitry 65 for processing detection charge output by the associated detector. Array 55 includes a number r of rows and a number c of column of pixels, where the array size, e.g., 32×32, 64×564, 140×160, etc., defines the x-y plane resolution of the sensor. Unfortunately it is difficult to readily implement a large, high resolution array 55 because of the relatively large area required for the individual pixels, perhaps 50 µm·50 µm. (Recall that the relatively small 5 µm·5 µm size for RGB pixels readily allowed implementing arrays of greater than 1 MP.) IC 45 also includes a microprocessor or microcontroller unit 70, memory 72 (which preferably includes random access memory or RAM and read-only memory or ROM), a high speed distributable clock 74, and various computing and input/output (I/O) circuitry 76. Among other functions, controller unit 70 may perform distance to object and object velocity calculations.

Under control of microprocessor 70, a source of optical energy 50 is periodically energized by an exciter 80, and emits optical energy via lens 85 toward an object target 20. Emitter 50 preferably is an LED or laser diode emitting low power (e.g., perhaps 50 mW peak) periodic waveform, producing optical energy emissions of known frequency (perhaps a few hundred MHz) for a time period known as the shutter time (perhaps 10 ms). Typically emitter 50 operates at IR, which is understood to include near IR, e.g., perhaps 800 nm).

Some of the emitted optical energy (denoted $S_1$) will be reflected off the surface of target object 20 (denoted $S_2$), will pass through an aperture field stop and lens, collectively 90, and falls upon two-dimensional array 55 of pixel detectors 60 to form a depth image.

For each pulse or burst of optical energy transmitted by emitter 50, a three-dimensional image of the visible portion of target object 20 is acquired, from which intensity (A) and Z data is obtained (DATA). More specifically, reflected incoming optical energy $S_2$ detected by each imaging pixel detectors 60 includes intensity information (A), and phase shift information ($\Phi$), where phase shift $\Phi$ varies with distance Z and can be processed to yield Z data. The time-of-flight (TOF) required for optical energy transmitted by emitter 50 to reach target object 20 and be reflected back and detected by pixel detectors 60 is denoted as t. TOF information is captured from which distances Z are determined from the relationship $Z1 = t \cdot C/2$, where Z is distance to be measured, t is roundtrip TOF time, and C is velocity of light. TOF sensor system 40 can acquire three-dimensional images of a target object in real time, simultaneously acquiring both luminosity data (e.g., signal amplitude) and true TOF distance measurements of a target object or scene. In FIG. 1B, Energy from emitter 50 and detected signals within pixel detectors 60 are synchronous to each other such that phase difference and thus distance Z can be measured for each pixel detector. If the phase-detection aspect of FIG. 1A were omitted, the resultant system would be essentially that of U.S. Pat. No. 6,323,942 in which pulses or bursts of optical energy are emitted and target-object reflected portions of that energy are detected and TOF is literally counted.

In many applications it can be important to simultaneously acquire from a single field of view or bore sight both data in a first spectral band, typically RGB data (used to provide an RGB image) and Z data (preferably acquired at in a second spectral band, typically IR wavelengths). But this goal is difficult to attain in practice because, as noted above, pixel detectors used to capture Z-data at IR wavelengths are commonly much larger in area than pixel detectors responsive to RGB wavelengths, an area that is perhaps 100 times larger. If a single detector array were fabricated to simultaneously use RGB pixel detectors and Z pixel detectors, the presence of the large sized Z pixel detectors in a high density array of much smaller sized RGB pixel detectors would cause large image artifacts that could degrade the quality of a resultant RGB image. Further, pixel detectors responsive to Z data often require high quality (preferably IR wavelength) bandpass filtering. In practice, CMOS fabrication does not presently implement such bandpass filtering for the Z pixels, especially with desired narrow band characteristics that may be on the order of 50 nm or less.

Applicants's co-pending application Ser. No. 11/044,996 was directed to a CMOS-implementable sensor that included pixel detectors responsive to wavelengths in a first spectral band, such as RGB wavelengths, and that also included pixel detectors responsive to preferably Z data in a second spectral band, preferably NIR wavelengths. Preferably such sensor array should be implementable on a single IC substrate.

Relevant to the present invention, in some applications there is a need to provide a low cost z-sensing system (or camera) that includes a first z-sensor array whose normally low x-y resolution can be increased by combining this first sensor array with a second lower cost, higher resolution RGB sensor array (or camera).

While such increased x-y resolution could be achieved by fabricating a single sensor array combining large area z-sensors with smaller area RGB sensors, preferably increased x-y resolution should also be achieved using a z-sensor array and a separate RGB sensor array, or sensor arrays as described in U.S. patent application Ser. No. 11/044,996. Further, such increased x-y resolution should be achieved without undue constraints with regard to the physical disposition of the first and second sensor arrays, e.g., without regard to whether the two arrays are disposed in mono or in stereoscopic relationship to each other.

The present invention provides such enhanced x-y resolution in a cost effective fashion, by substantially simultaneously using a fusion algorithm to combine output from a first, low resolution, z-sensor array, with output from a second, higher resolution, inexpensive RGB sensor array to yield a single frame of high resolution z-data, which high resolution may be greater than or equal to the RGB sensor resolution.

BRIEF SUMMARY OF THE INVENTION

Before summarizing the present invention, it is useful to summarize the invention of the Ser. No. 11/044,996 application. That invention provided a sensor with an array region of high resolution pixel detectors responsive to wavelengths in a first spectral band (such as RGB wavelengths) used to generate an image that preferably is an RGB image, and that also included an array region of typically lower resolution pixel detectors responsive to wavelengths in a second spectral band (preferably but not necessarily NIR) used to acquire Z data. If desired, wavelengths of the second spectral band (used to acquire Z data) could overlap with wavelengths of the first spectral band (used to acquire an RGB image.) In the invention of the Ser. No. 11/044,996 application it was desired to acquire a good resolution RGB image of a target object a distance Z away, and to also use Z data to rapidly identify what and where the target object was.

In the various embodiments of the Ser. No. 11/044,996 application, incoming optical energy from a target object included wavelengths from both the first and second spectral bands (which bands could overlap), and preferably these wavelengths could include both RGB and preferably NIR components. In some embodiments, this energy was presented to at least one optical splitter that may be implemented as a wavelength-discriminating mirror, for example a hot mirror or a cold mirror. In other embodiments, a half-mirror (e.g., a mirror that reflects perhaps 40% to perhaps 60% of incoming optical energy) acted as the optical splitter. In these embodiments, the optical splitter operated passively to output an RGB image and a preferably NIR image. The RGB image could be focused upon an RGB pixel detector array, while the preferably NIR image could be focused upon a Z pixel detector array. Output from even a relatively low resolution pixel detector array that acquired Z data using preferably NIR wavelengths could be used to determine target object size, distance Z, target object velocity $\Delta Z/\Delta t$. The Z data aided in rapidly identifying a target object imaged by the preferably RGB array.

The present invention recognizes that in some applications, it is desired to rapidly identify the size and range of objects, and to then rapidly estimate the shape of the objects to know what the object is. For example, an RGBZ imaging system disposed in a motor vehicle can image objects including pedestrians in the path, forward or reverse, of the vehicle. If the object is determined by the system to be a pedestrian, a driver-viewable display may show an avatar or icon alerting the vehicle driver to the hazard. A suitable system may even apply the vehicle brakes if contact with the object determined to be a pedestrian is imminent.

According to the present invention, a low resolution z-image acquired from a first z-sensor array can rapidly determine the size and range of the object. But to determine the nature of the object, e.g., pedestrian or telephone pole, requires greater resolution, e.g., available from a second higher resolution RGB-sensor array. The present invention can render an RGBZ image using up-sampled z-image data, where the RGBZ image can have resolution equal to or even exceeding resolution of the second sensor array, from which image a user can readily identify objects, either as objects or avatars or icons. More specifically, according to the present invention, images are acquired using a first TOF z-sensor array (that acquires z-data and brightness data, albeit in relatively low resolution), and using second, high resolution, RGB sensor array. Frames of z-data and RGB-data are acquired substantially (but not necessarily exactly) simultaneously and are combined or "fused" to produce a single RGBZ frame of data of enhanced resolution. This fusion process results in higher z-resolution in the x-y plane, without having to provide a higher resolution first (z-sensor) array.

The fusion preferably is implemented with a fusion algorithm that seeks to take advantage of the different types of correlative or discrepant information provide by the first and second arrays. Preferably the fusion algorithm is substantially independent of whether mono or stereographic arrays are used. Fusion algorithms according to the present invention result in observably high accuracy with minimal registration overhead, and elimination of image correspondence problems so common with traditional approaches to depth-inference in the field of computer vision. A fusion algorithm according to the present invention provides for generality and extensibility, and can substantially reduce computational complexity. Preferably, time correlation of data captured from the first and second array is generalized by associating timing information with captured image data, e.g., by time-stamping captured frames of z-data and RGB data and enqueing in order of arrival. Preferably the algorithm enables association of image frames from the two arrays to take on an arbitrary mapping relationship. An effective sensor array providing z-resolution commensurate with, if not exceeding, resolution of a 1 MB z-sensor array can be implemented using a 1 MB RGB sensor array and a lower resolution z-sensor array.

Other features and advantages of the present invention will appear from the following description in which the preferred embodiments have been set forth in detail, in conjunction with the accompanying drawings.

BRIEF DESCRIPTION OF THE DRAWINGS

FIG. 16 depicts interstitial points used in gradient-based interpolation, according to an embodiment of the present invention;

FIG. 17A depicts a source RGB frame used to illustrate uniformity within RGB pixel regions, according to an embodiment of the present invention;

FIGS. 17B-17F depicts exemplary 5-f candidate regions within the RGB frame shown in FIG. 17A, according to an embodiment of the present invention.

DETAILED DESCRIPTION OF THE INVENTION

Reference will now be made in detail to the preferred embodiments of the present invention, examples of which are illustrated in the accompanying drawings. While the present invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 7:
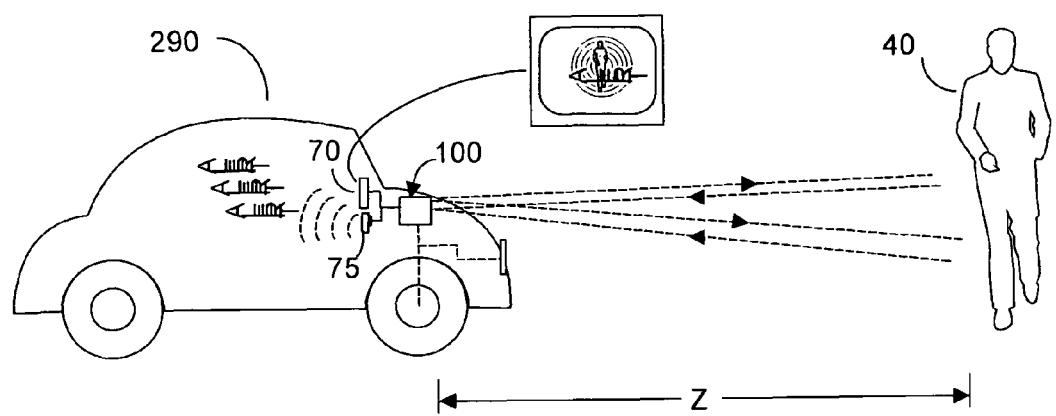
FIG. 7 depicts a pedestrian recognition and avoidance application of the present invention, using an RGB-Z sensor according to applicants's co-pending Ser. No. 11/044,996 application.
Figure 8A:
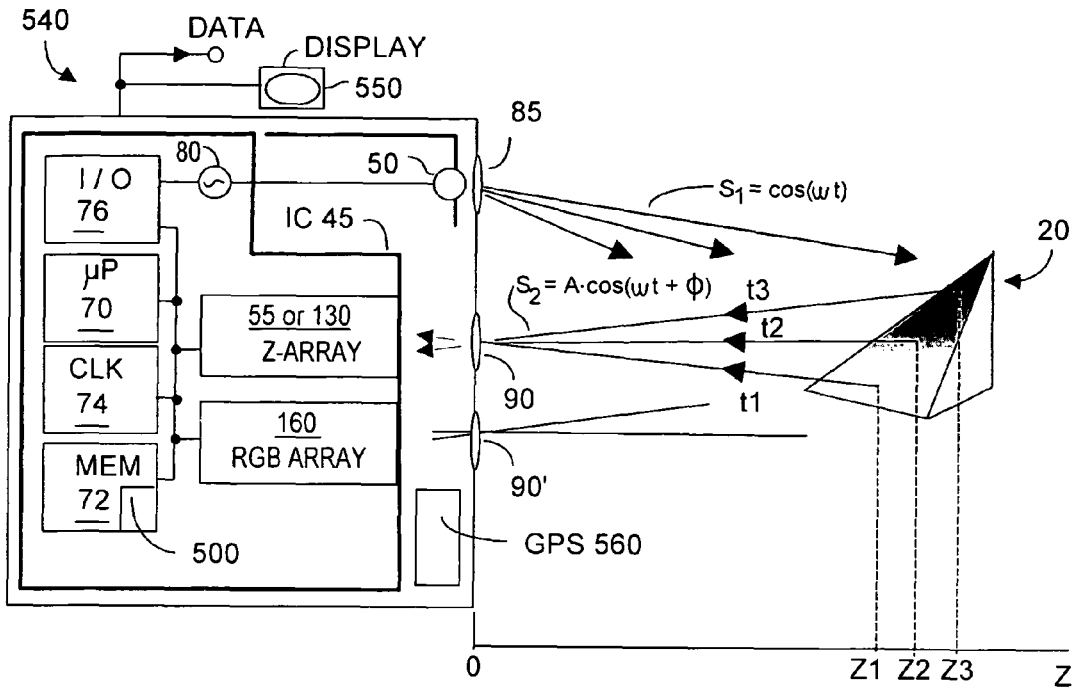
FIG. 8A depicts a generic TOF system having a first high resolution RGB sensor array, a second lower resolution Z sensor array, and a fusion algorithm, according to an embodiment of the present invention.

A description of the present invention commences with FIG. 8A. However it will be useful to appreciating the present invention to first review the invention of applicants's co-pending Ser. No. 11/044,996 application, which will now be described with reference to FIGS. 2-7.

Figure 2:
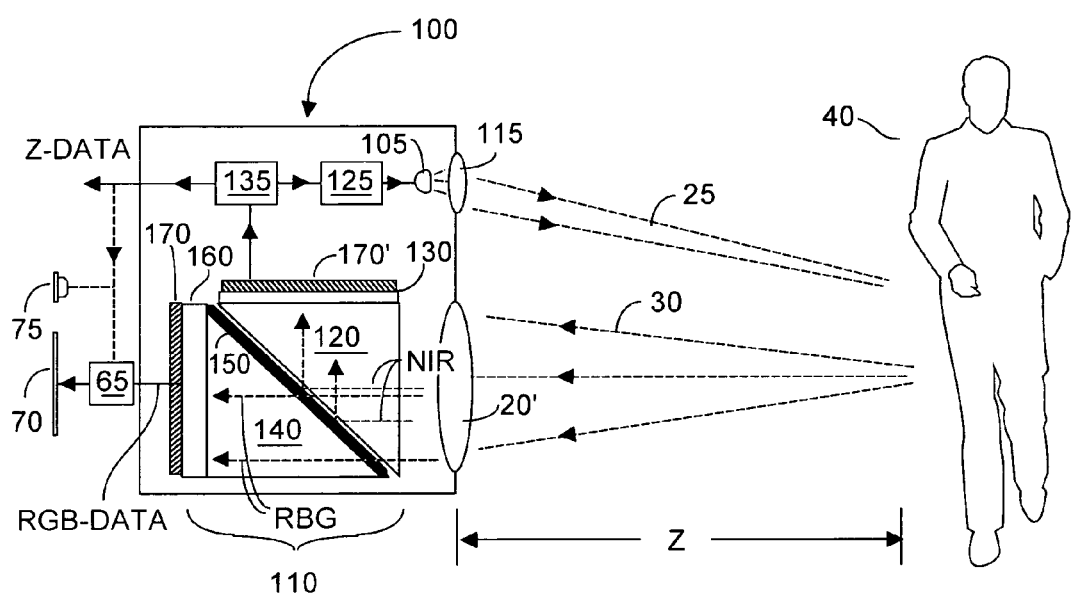
FIG. 2 depicts a first embodiment of an RGB-Z sensor, according to applicants's co-pending Ser. No. 11/044,996 application.

FIG. 2 depicts a camera system 100 that includes a preferably RGB-Z sensor 110, according to the Ser. No. 11/044,996 application. RGB-Z sensor 110 includes an array 160 of high resolution pixel detectors responsive to wavelengths in a first spectral band, preferably RGB wavelengths, and an array 130 of lower resolution pixel Z detectors responsive to wavelengths in a second spectral band. The second spectral band may or may not overlap with the first spectral band, and is preferably NIR wavelength so as to be unobtrusive to the human eye. Roughly speaking, operating bandwidth of the first spectral band may be in the range of about 400 nm to about 900 nm, and preferably in the range of about 450 nm to about 650 nm. (As a practice matter, these wavelength limits are governed by the response of pixel diode detectors that can be implemented upon a silicon substrate.) It is understood that not all of these wavelengths need be present or used, and that the term RGB is understood to include subsets of wavelengths within the approximate range 450 nm to about 650 nm. For example, a sensor might be designed to detect and generate image data from incoming optical energy of a single color. If the second spectral band is implemented using IR or near IR wavelengths, then the operating wavelength will be about 800 nm with a bandwidth of perhaps 50 nm. These wavelengths and bandwidths are understood to be exemplary. From a practical standpoint, wavelengths closer to NIR are preferred for ease of implementing a Z detector on a silicon substrate.

Sensor 110 preferably includes optically transparent structures 120 and 140 that may, without limitation, be air, plastic, glass, among other materials. For ease of illustration, structures 120 and 140 are shown slightly spaced apart; however such spacing-apart is not necessary and spacing apart may result in undesired reflections. Adjacent an output surface of structure 120 is a first array of pixel detectors, here distance or Z-sensor 230. This first array of pixel detectors 130 is responsive to preferably NIR wavelength radiation, and is formed on a first IC substrate 170'. Output from preferably NIR array 130 yields Z data, which data, without limitation, can yield information regarding target object 40 including distance Z, size, shape, and velocity.

Sensor 110 further includes a beam splitting structure 140, which is shown as a wavelength-discriminating mirror, here an exemplary hot mirror surface 150. An output surface of structure 140 interfaces with a second array of pixel detectors, here RGB array of pixel detectors 160 fabricated upon a second IC substrate 170. The output from RGB pixel detector array 160 may be used to produce an RGB output image 70 that may be presented on an electronic display, printed on a medium such as paper, among other modes of display.

In the embodiment shown in FIG. 2, an active source for the detected second spectral band energy is provided. System 100 includes an optical emitter 105, whose optical 25 output passes through optional lens 115 to be focused generally towards the direction of a target object Z. In one embodiment, emitter 105 is an NIR diode, emitting wavelengths of about 800 nm with a power of perhaps 0.5 W to 3 W, depending upon the application at hand. Other devices emitting other wavelengths and power may of course be used, although advantageously NIR emitting diode devices are relatively inexpensive. Emitter 105 output preferably is modulated responsive to a modulator unit 125. Modulation, which may include pulsing, may be in the range of perhaps 10 MHz to perhaps 100 MHz, with a duty cycle of perhaps 50%. Modulator units 125 having other modulation characteristics could instead be used and the values and wavelengths recited above are exemplary.

In the embodiment shown, structure 140 includes a wavelength-discriminating mirror structure shown here as a hot mirror that includes a hot mirror surface 150. Hot mirrors are known in the art and have the characteristic of reflecting "hot" energy components, which is to say NIR components, while passing relatively unattenuated shorter wavelength optical energy components, here RGB components. A wavelength of about 700 nm typically demarks whether structure 140 passes or reflects incoming optical energy. If the incoming wavelength is longer than about 700 nm, the energy is NIR and is reflected by structure 140 into structure 120 for detection by NIR array 130. If the incoming wavelength is less than about 700 nm, the energy is RGB and passes through structure 140 for detection by RGB array 160. Depending upon how structure 140 is designed, the demarcation wavelength may be somewhat greater than or shorter than the exemplary 700 nm described above. Thus energy emitted by emitter 105 (e.g., wavelength preferably of about 800 nm) that is at least partially reflected by target object 40 will be reflected by surface 150 into NIR detector array 130, e.g., an array responsive to spectral energy of a second spectral band.

Those skilled in the art will appreciate that splitting structure 140 may be implemented with a cold rather than a hot mirror. In such an embodiment, the location of arrays 130 and 160 would be interchanged as incoming RGB wavelengths would now be reflected, and incoming NIR wavelengths would now be passed by cold mirror surface 150.

As noted, the size of individual pixel detectors in Z preferably NIR detector array 130 will be substantially larger than the size of individual pixel detectors in RGB detector array 160. The size disparity will be on the order of perhaps ten in terms of cross-sectional dimension, which is to say on the order of perhaps one-hundred in terms of cross-sectional area. In practice, the resolution of RGB array 160 may be substantially better than that of Z detector array 130. By way of example, RGB array 160 may be implemented with 640 pixel rows and 480 pixel columns, whereas Z detecting preferably NIR array 130 may be implemented with 64 rows and 48 pixel columns. It is to be understood that the above noted resolution numbers are exemplary and embodiments using other resolution values may of course be implemented without departing from the spirit of the present invention.

In FIG. 2, Z information sensed by the second spectral band pixel detector array 130 may be passed to a Z processor 135 that outputs Z data such as distance Z, size (breadth, height) of target object 40, as well as velocity $\Delta Z/\Delta t$ of the target object. Methods and hardware for processing Z type information are known in the art, and include U.S. patents issued to assignee herein Canesta, Inc., now of Sunnyvale, Calif.

RGB information output from the first spectral band pixel diode detector array 160 can be coupled to an image processor, here RGB processor unit 65, whose output can be displayed electronically and/or on medium (e.g., paper) 70. Not withstanding that resolution of the Z data is lower than that of the image (here RGB) data, the Z data can still be highly useful in rapidly identifying the target object imaged by unit 70. Z data can be coupled to RGB processor unit 65 to augment display 70, for example to display warnings, perhaps expending red concentric circles emanating from the image of the target object, and/or warning signs and words. Z data may also be coupled to help focus lens 20' to improve quality of the display 70. Audible warning sounds and/or enunciated words may also be emitted, e.g., from transducer 75. Although the embodiment of FIG. 2 works well, it is noted that the two sensor arrays of pixel detectors 130, 160 are formed on two discrete IC substrates, 170', 170. By contrast, as described below, the embodiment of FIG. 3 can be implemented on a single substrate.

Figure 3:
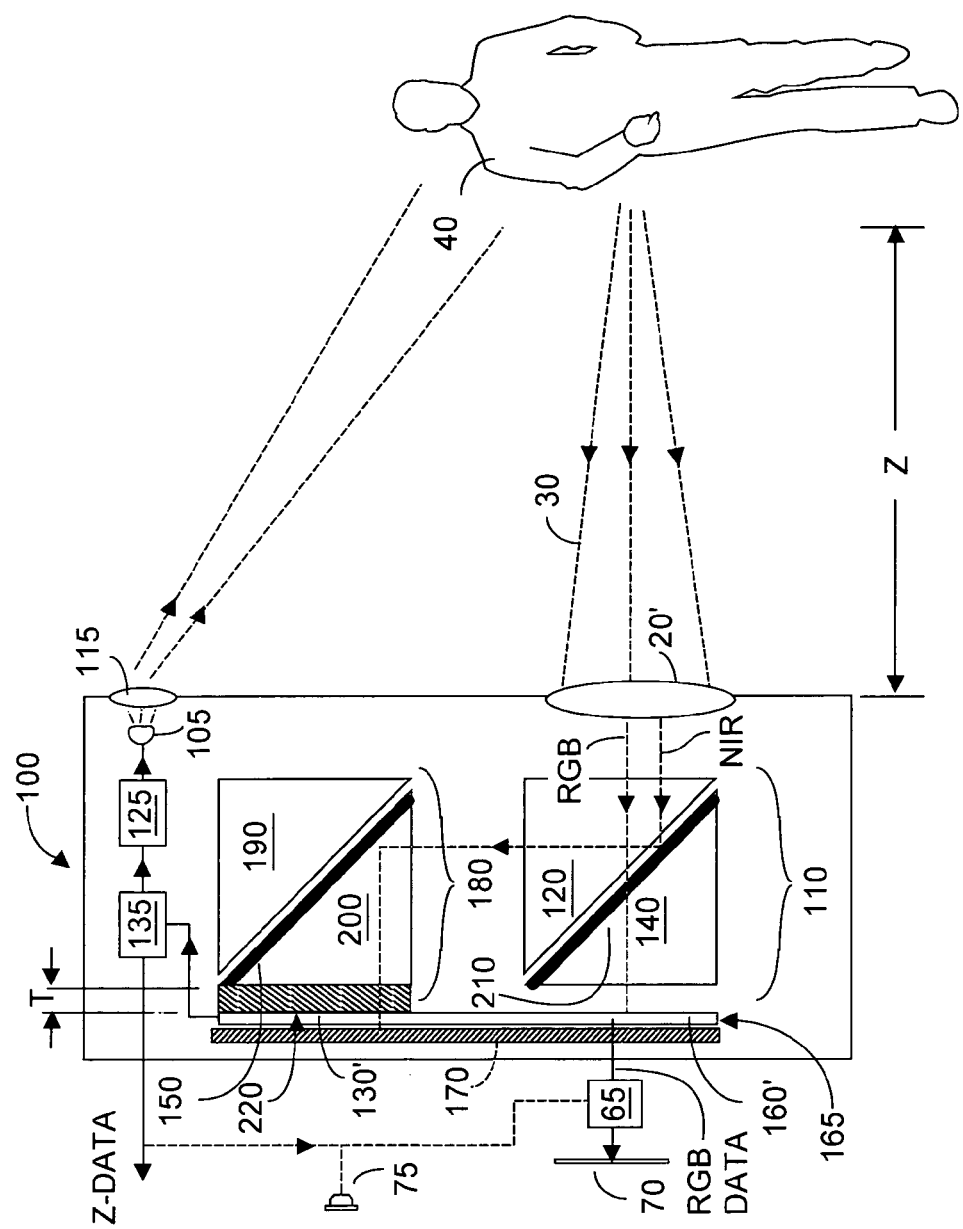
FIG. 3 depicts a second embodiment of an RGB-Z sensor in which a single IC substrate is used to fabricate first and second spectral band arrays, according applicants's co-pending Ser. No. 11/044,996 application.

FIG. 3 depicts another embodiment of a camera system 100 that includes an RGB-Z sensor system comprising first and second spectral band RGB-Z sensors 110, 180, implemented on a single IC substrate 170, according to the Ser. No. 11/044, 996 application. Unless stated otherwise, elements in FIG. 3 that were described with reference to FIG. 2 may be considered to be the same elements in FIG. 3. In this embodiment RGB and Z images are focused by common lens 20' onto a single sensor 165 formed on single IC substrate 170. As described below, sensor array 165 includes a first spectral band pixel sensor array portion 160' (preferably an RGB detector), and a second spectral band pixel sensor array portion 130' (preferably an NIR detector). As noted above, resolution of the two pixel sensor array portions may differ substantially while still providing useful Z information.

In FIG. 3, optical energy 30 passes through a common lens 20' and passes through optical structure 120, with a path that defines an optical axis that in this embodiment coincides with the boresight axis. Note that in this embodiment, the optical or boresight axis is perpendicular to the focal plane defined by substrate 170, which includes image and Z detectors 160', 130', Adjacent structure 120 is a splitter structure 140 that is preferably an optically transparent structure. (As was the case with structure 120 in FIG. 2, "optically transparent structure" is understood to include a structure that may be air, plastic, glass, among other materials.)

In the embodiment shown, splitter structure 140 includes a frequency-discriminator mirror surface, here exemplary hot mirror surface 210. As a result, incoming optical energy that is "hot" or includes preferably NIR components is reflected by surface 210 into a reflecting system 200 in assembly 180. Z components, preferably NIR wavelengths, reaching assembly 180 are reflected, by surface 150, here an exemplary ordinary mirror. If desired, a cold rather than a hot mirror surface may be used, with suitable interchange of the two sensor regions upon IC substrate 170.

As shown in FIG. 3, reflected components preferably pass through an optical path length equalizer element 220 before being detected by Z detecting pixel array detector portion 130' of array 165, formed on a common IC substrate 170. Depending upon the index and thickness of elements 200 and 190 and the optical and focus considerations the path length equalizer may be on either of the optical paths. Output from preferably NIR pixel array detector portion 130' is Z data, which data can be used to provide size and distance and other parameters regarding target object 40. Z data may be used to help accurately identify the nature of target object 40. In some applications, Z data may be used to improve quality of image 70, for example by improving focus of lens 20', and/or by using Z data and imaging processing techniques to de-blur image 70. In the embodiment of FIG. 3, it is understood that a cold mirror rather than a hot mirror may be used as element 140 if the location of array portions 130' and 165 are interchanged.

To summarize, in the embodiment of FIG. 3, RGB components of incoming optical energy passing through lens 20' will pass relatively unattenuated through elements 120 and 140 to be detected by the RGB pixel array detector portion 160' of common IC substrate 170. Preferably NIR components, however, are reflected by surfaces 210 and 150 to be detected by the Z pixel array detector portion 130' on the common IC substrate 170. As such substrate 170 may be considered to include an overall array 165 that includes array portions 130' and 160'.

As in earlier described embodiments of the Ser. No. 11/044,996 application, the RGB or display output from detector portion 160 may be used to present an output image 70 representing the target object 40. Identification characteristics of target object 40 within output image 70 may be enhanced using Z data, including without limitation the display of warning colors in image 70, highlighting at least a portion of the display of target object 40. Further Z data may be used to sound audible alarms, to generate feedback signals, perhaps to the braking system and/or headlight system in a motor vehicle that includes system 100 as part of a driving hazard warning system.

In general the optical path associated with one of the Z and the RGB components will be longer than the other path. In the configuration of FIG. 3, an optical path length equalizer element 220 is included to optically equalize the two paths and depending on the index and thickness of 190 and 200 it may be placed on either of the two paths. Equalizer element 220 may be a substantially flat piece of high index material, glass for example, and the inclusion of equalizer element 220 makes objects in the longer optical path appear closer. The result is that a common focal plane exists for the RGB and the Z images formed on respective detector regions 160', 130' on overall array 165 formed on substrate 170. However since the support structure for hot, cold, or ordinary mirror surfaces present in the invention may in fact include glass, in some applications the need for a separate discrete optical path length equalizer may be eliminated.

If desired, equalizer element 220 may be implemented using optics, e.g., a converging and/or diverging lens, to move the focal point of the longer optical path forward. Equalizer elements similar to element 220 may be disposed at various locations in the two optical paths. In FIG. 3, a single planar equalizer element 220 is shown. Assume that the material comprising this element has a high index n, and that the difference in path length between the two optical paths due to the beam splitter(s) is D. In this example, the front-back thickness of element 220 is T, where $T=D/(n-1)$. By way of example, if D=5 mm (in air), and n=1.65, then the thickness T of element 220 will be $T=5$ mm$/(1.6-1)=8.3$ mm.

In practice, thickness T may be rather large compared to the numerical aperture of lens 20' and thus spherical aberration can occur. The effects of spherical aberration may be mitigated maintaining RGB image sharpness at the expense of the Z image focus for example by inserting a flat element 220 which generate aberrations in front of the NIR pixel sensor array 130', which array 130' typically has larger sized pixels than the RGB array 160'. Alternatively a correction lens may be included in the optical path. If either the RGB or the Z optical path includes a substantial path through high index material (e.g., $n \geq 1.2$ or so) resultant spherical aberration can be reduced by including a correction lens on one of the paths, preferably the path with the aberration.

Optical path length equalizers such as 220 will introduce some optical aberrations, which aberrations will be less perceptible if applied to the Z array, which will usually be designed with lower resolution than the RGB array. Thus if one of the optical paths is to be compromised, less degradation occurs if the Z path is impacted. It will be appreciated that if a high performance bandpass filter that passes a narrow band of frequencies centered at the operating wavelength of the Z sensor illumination may be included along the Z optical path to improve performance. An exemplary high performance bandpass filter might have at least one of the following characteristics: a bandpass as narrow as perhaps 40 nm), passband attenuation as low as perhaps $\leq 5\%$), and, and a stopband attenuation as high as perhaps $\geq 95\%$.

Figure 4:
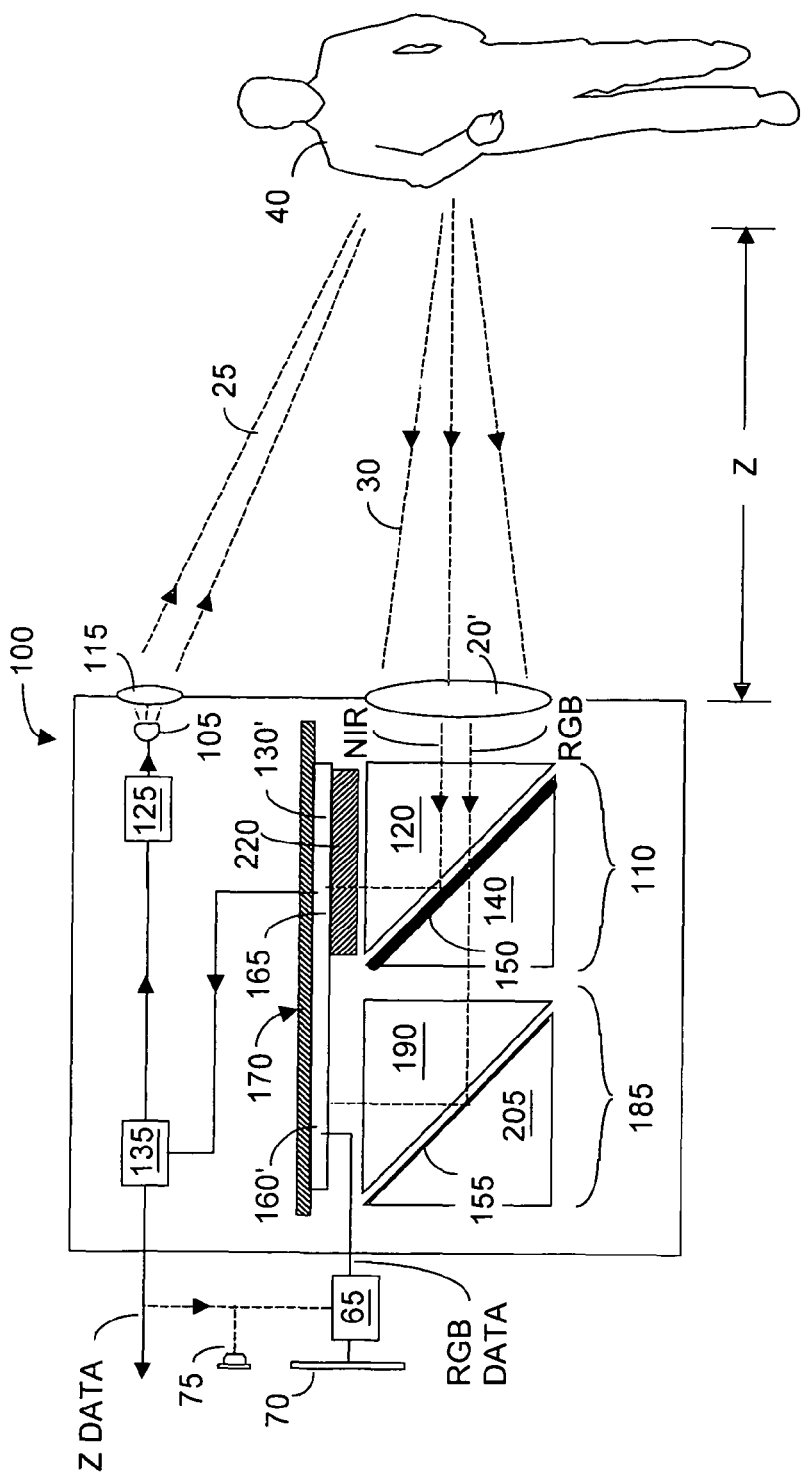
FIG. 4 depicts a third embodiment of an RGB-Z sensor fabricated on a single substrate IC in which the focal plane is parallel to the bore sight axis, according to applicants's co-pending Ser. No. 11/044,996 application.

FIG. 4 shows yet another embodiment of a camera system 100 that includes an RGB-Z sensor system comprising first and second spectral band RGB-Z sensor regions 160', 130', associated with splitter unit 110 and reflecting unit 185, according to the Ser. No. 11/044,996 application. As with the configuration of FIG. 3, in this embodiment RGB and Z images are focused by common lens 20' onto respective RGB and Z pixel array detector regions 160', 130' formed on a single sensor array 165 that is fabricated on a single IC substrate 170. A description of components 105, 115, 125, 135, 65, and 75 need not be repeated here. As described below, sensor array 165 includes an image, preferably RGB, detector pixel sensor array portion 160' and a Z detector pixel sensor array portion 130'.

In contrast to the configuration of FIG. 3, the embodiment of FIG. 4 uses a focal plane parallel to the bore sight axis, e.g., the detector plane defined by substrate 170 is parallel to the optical axis defined by optical energy passing through lens 20'. In FIG. 4, system 100 includes a beam splitter 110, comprising elements 120, 140, and exemplary hot mirror surface 150, as has been described earlier herein. Beam splitter 110 reflects Z components through element 120, through equalizer element 220 into Z pixel sensor array region 135' on detector sensor array 165, which is formed on IC substrate 170.

In FIG. 4, Z components pass substantially through beam splitter 110 into element 185 comprising a spacer 120, which as noted may be air, plastic, glass, among other materials, into a beam reflector 205 that includes a reflecting mirror surface 155. Thus, preferably NIR energy falling upon element 185 will be reflected through spacer material 190, which may be air, plastic, glass, etc., into Z pixel detector array portion 160' of detector sensor array 165, formed on IC substrate 170.

The RGB components are reflected from beam splitter 120 onto RGB array 135'. Output from detector portion 135', as in earlier described embodiments, may be used to present an output image 70. Information presented in output image 70 may be enhanced using Z data obtained from the NIR sensor region 160'. Path length equalizer element 220 helps ensure that both images are focused in the same plane.

It will be appreciated that if the Z data sensor array operates at a wavelength in the RGB band rather than at NIR wavelengths, then a half mirror instead of a beam splitter may be used in the embodiments of FIGS. 2-4. In such mode of operation, wavelengths in the operating spectra of the Z sensor will be split between the RGB and Z sensors. If desired, other wavelengths may be split or transmitted to the RGB sensor using a combination of splitter and half mirror devices, although in practice using only a half mirror may suffice, for reasons of simplicity and economy. Thus, in FIGS. 2-4, surface 150 would now be a half-mirror rather than a wavelength splitter. As noted above with respect to a beam splitter, a high performance filter may be added to the optical path associated with the Z array. The use of other than NIR wavelengths to acquire Z data permits the use of optical energy generated by a target object itself. For example in the near future motor vehicle headlights will be high intensity LEDs. If such headlights include a modulated light component, the present invention can acquire Z data by sensing the modulated LED wavelength. (It is assumed here that the motor vehicle manufacturers will be motivated to include modulated LED light components in the headlight output.) In this case Z data could be acquired from a pedestrian or other target object illuminated only by the LED headlights of a vehicle carrying the present invention, without the need to provide an additional second spectral band illumination source.

Figure 5:
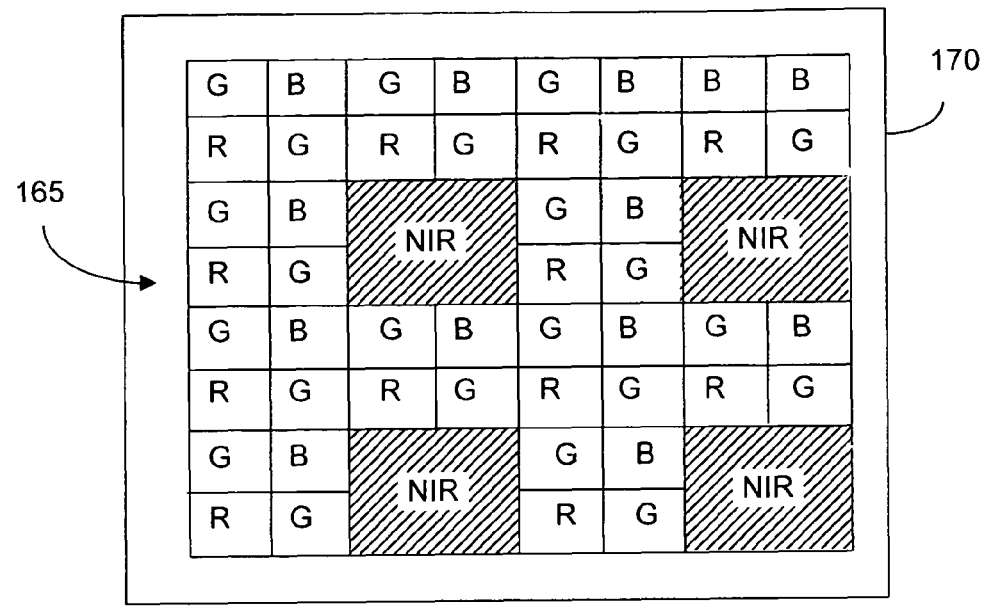
FIG. 5 is a plan view of an embodiment of an RGB-Z sensor in which image pixel detectors and Z pixel detectors are interspersed in a common RGB-Z sensor array implemented on a single IC substrate, according to applicants's co-pending Ser. No. 11/044,996 application.

FIG. 5, taken from the Ser. No. 11/044,996 application, is a plan view depicting a configuration of sensor array 165 in which first spectral band detector regions 160' comprising R, G, B pixel detectors and second spectral band detector regions 130' comprising, here, NIR pixel detectors are interspersed on common IC substrate 170. To avoid cluttering the figure, regions 160' and 130' are not specifically identified. However the cross-hatched (NIR) regions are regions 130', and the R, G, B regions are regions 160'. As noted, the dimensions of the Z detecting regions (here, NIR) will be substantially larger in size than the RGB detecting regions, perhaps ten times larger in size, which is to say perhaps one-hundred times larger in cross-sectional area. In practice, the presence of the substantially larger NIR pixel detectors will cause symmetry dislocations within array 165.

Figure 6:
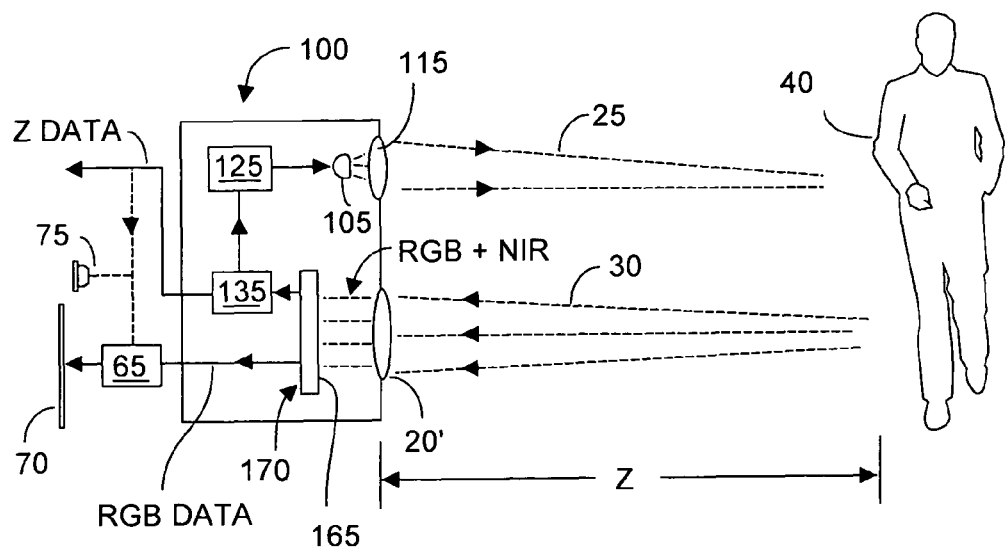
FIG. 6 depicts a fourth embodiment of an RGB-Z sensor fabricated on a single IC substrate, utilizing an sensor array depicted in FIG. 5, according to applicants's co-pending Ser. No. 11/044,996 application.

FIG. 6 depicts an embodiment of an RGB-Z sensor 100 that uses a sensor array 165 as depicted in FIG. 5, according to the Ser. No. 11/044,996 application. Incoming optical energy 30 passing through common lens 20' will include first and second spectral band components, here RGB and NIR components. RGB and NIR optical energy is focused upon array 165. Portions of RGB energy that fall upon RGB pixel diode sensors are detected by that portion of the array. Similarly portions of NIR energy that fall upon NIR pixel diode sensors are detected by that portion of the array. The respective outputs from the RGB and the NIR pixel diode sensors are coupled respectively to RGB processor 65 and to Z processor 135, as described earlier herein. The function of components 105, 125, 65, and 70 have been described with respect to other embodiments, and need not be further described.

Various embodiments of the invention of the Ser. No. 11/044,996 application advantageously combine the high optical efficiency associated with splitters, with the economy of fabricating an RGB-Z sensor on a single IC substrate. As such, an RGB-Z sensor according to the present invention can be cost competitive with prior art RGB or image sensors, while providing more useful information by sensing additional components of optical energy, for example NIR.

FIG. 7 depicts an exemplary application of the invention of the Ser. No. 11/044,996 application, namely use in a motor vehicle to identify objects, such as detecting a pedestrian in the vehicle's path. Thus a motor vehicle 290 is shown equipped with an RGB-Z sensor system 100, according to the present invention. In this embodiment, system 100 outputs optical energy to acquire Z data (preferably NIR), and detects both reflected such optical energy, as well as preferably RGB wavelengths reflected from target object 40 from ambient light (perhaps sun light, not shown).

Pedestrian detection involves identifying the shape and size of an object in front of a motor vehicle to determine whether the object is a pedestrian. A pedestrian may be deemed to be an object with size about 1.5 m×40 cm with a shape defining legs at the object bottom. High resolution BW or RGB is used to determine the shape of the object. Lower resolution Z is sufficient to determine the distance Z to the object because the object size spans many RGB pixel detectors on a detector array, and hence at least one Z pixel detector. If the shape and distance of the target object can be acquired using the present invention then the size can be determined also. It then becomes relatively easy to determine from the acquired data whether the target object is a pedestrian and if so, to alert the operator of a motor vehicle containing the present invention.

Figure 1A:
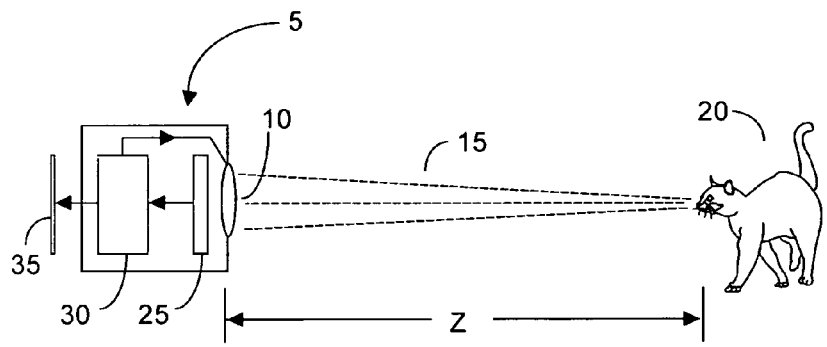
FIG. 1A depicts a camera system using a conventional RGB sensor, according to the prior art.

Thus in FIG. 7, Z processor 135 can augment RGB data presented to RGB processor 65, for use in determining whether target object 40 is a pedestrian. Z processor 135 may include memory storing parameters of what a "pedestrian" should look like with respect to size, shape, range of velocities, etc. If the determination is made that target object 40 is a pedestrian, then the present invention can be used to enhance image 70, and/or sound audible signals (audible to the operator of vehicle 290 and perhaps also audible to the target object, e.g., sound the vehicle's horn). In addition, the present invention can output feedback signals useable to automatically brake the vehicle and/or apply or flash the vehicle headlights, to alert the pedestrian to danger from vehicle 290. These functions can be implemented more reliably than if an ordinary prior art camera system such as shown in FIG. 1A were used. These functions can be performed with much greater resolution than if ultrasound techniques were employed, and at far less cost and with better spatial resolution than if GHz range radar systems were employed. In practice, exemplary range resolution using the present invention can be about 3 cm to about 20 cm, within a range of perhaps 1 m to about 25 m.

Having completed the description of the Ser. No. 11/044,996 application, the present invention will now be described with reference to FIG. 8A-FIG. 17F.

Figure 8B:
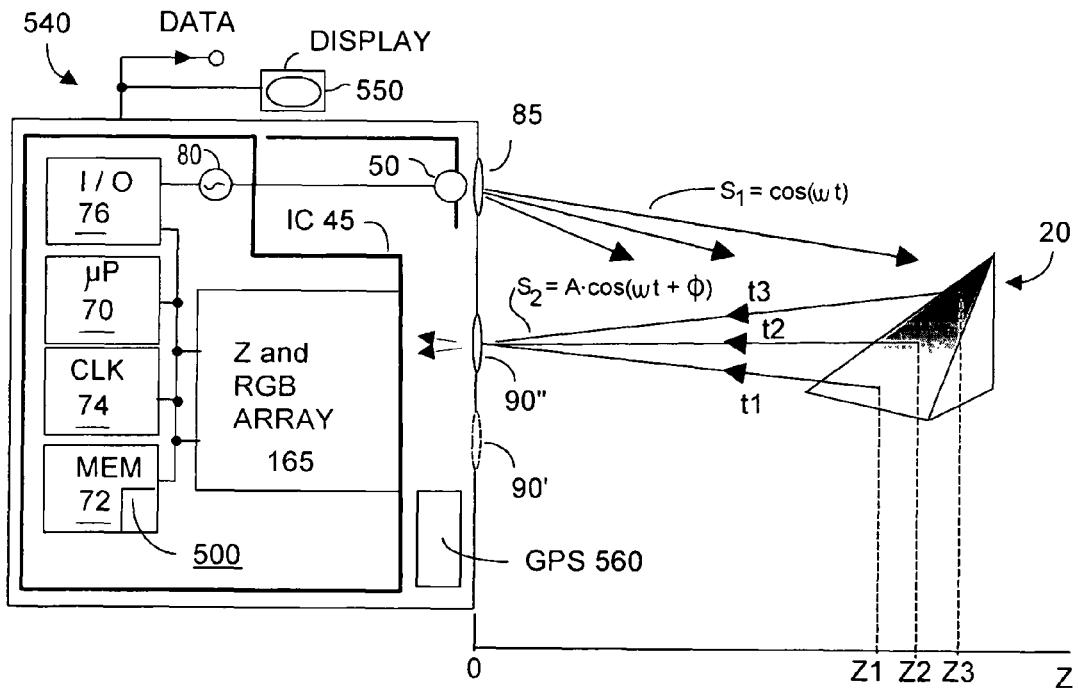
FIG. 8B depicts a TOF system having a merged Z-RGB array, and a fusion algorithm, according to an embodiment of the present invention.

FIGS. 8A and 8B depict systems 540 that include a z-sensor array 55 or 130, and a higher resolution RGB sensor array 160. In the embodiment of FIG. 8A, discrete first and second arrays are shown, a stereographic array configuration, whereas the embodiment of FIG. 8B includes a super array 165 that includes both z-pixels and RGB-pixels, a monographic configuration. It is understood that any of the embodiments of FIG. 2-6 may be used to implement system 540. System 540 includes memory 72, which may be as described with respect to FIG. 1B, and has stored therein a software routine 500 that upon execution, perhaps by microprocessor 70, carries out procedures to implement at least one fusion algorithm, as described herein. For purposes of the present invention, system 540 may include separate lenses 90, 90' to focus incoming z-optical energy, and incoming RGB optical energy, or may include a single optical lens 90".

In addition to outputting desired DATA information, systems 540 can also drive a display 550 upon which user-viewable RGBZ images may be seen. As noted herein, an advantage of the present invention is its ability to rapidly construct RGBZ images for viewing on display 550, where fewer, larger z-pixels can rapidly help determine z-information and size of a target object 20, and where smaller but more RGB pixels can readily determine the shape of the target object. Display 550 can present an RGBZ image of the target object and/or one or more icons or avatars representing important information present in the scene being imaged. Optionally systems 540 can include or be coupled to a global position satellite receiver, GPS 550, whose output can be combined with what is shown on display 550. An example of such an application is described later herein with respect to FIG. 18.

The present invention provides what will be termed a fusion algorithm to intelligently combine data from the substantially simultaneous (if not exact) capture of comparatively low resolution z-depth (including brightness and active brightness) data from a first array, and higher resolution RGB (color image) data from a second array. The fusion algorithm can provide z-data whose resolution can be as high as that of the higher resolution RGB array, or even exceed the RGB array resolution.

Figure 1B:
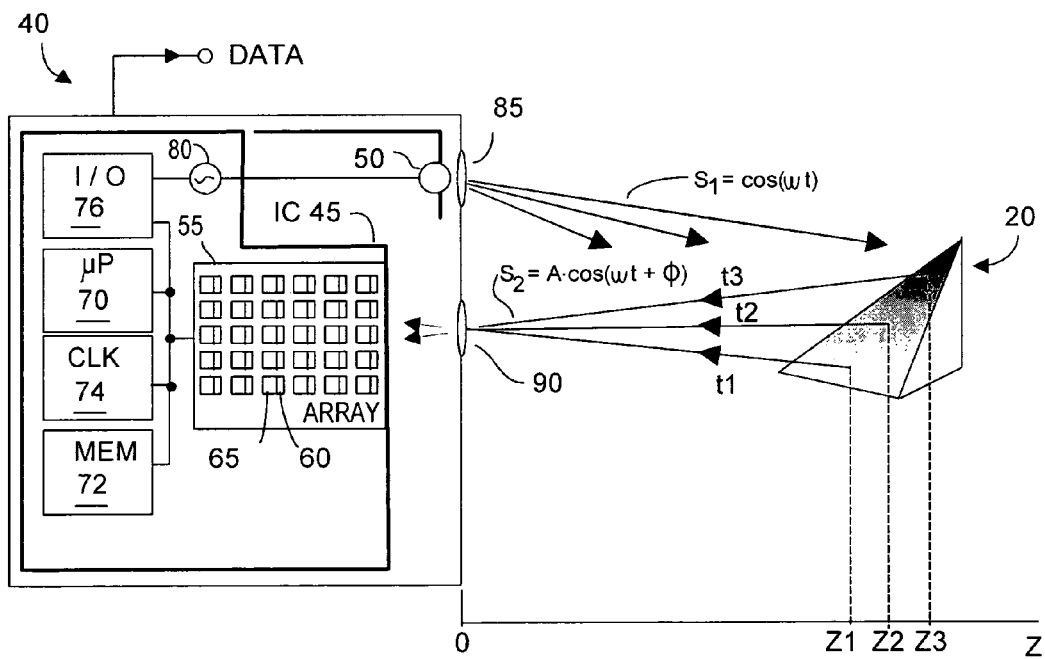
FIG. 1B depicts a phase-shift time-of-flight system able to acquire brightness and Z-depth data, according to the prior art.

As used herein, "brightness" refers to the brightness value recorded at each pixel in the first z-depth sensor array, responsive to illumination other than illumination emitted by the system. "Active brightness" refers to the brightness value recorded at each pixel in the first z-depth depth sensor array, responsive solely to the system's source of illumination. In FIG. 1B, "brightness" would be brightness data collected not responsive to illumination from emitter 50, whereas "active brightness" would be brightness data collected responsive to reflected energy originating from emitter 50.

A fusion algorithm according to the present invention recognizes that even identical data rates from the first and second sensor arrays will result in non-synchronous image data streams. Further, such fusion algorithm preferably recognizes that the needs of a given system application may favor image rendering speed as opposed to data precision, or vice versa. Those skilled in the art will recognize that time-correlation of captured data is indeed a subtle problem. Accordingly, a fusion algorithm according the present invention keeps time correlation of captured data as general as possible by associating timing information with captured image data. The procedure advantageously allows association of image frames from multiple data sources, e.g. from the first sensor array (e.g., z-depth) and preferably higher resolution second sensory array (e.g., RGB array or RGB camera) to take on an arbitrary mapping relationship. This method advantageously allows association of image frames from multiple data sources to take on arbitrary mappings, which concern association of different image frames in the temporal domain.

In practice, frame capture rates for the first and second sensors (z-data, RGB data capture) may differ, and thus the mapping between frames captures from each sensor may be simple, or complex. According to embodiments of the present invention, the mapping relationship between the first and second, e.g., z and RGB, frame streams can be one-to-one (i.e., a single z frame is mapped to only a single RGB frame), one-to-many (i.e. a single z frame is mapped to multiple successive RGB frames), and many-to-one (i.e. multiple z frames are mapped to a single RGB frame). The one-to-one mapping scenario is applicable if the z-sensors and the RGB sensors happen to capture data at precisely the same rate. But if the RGB sensor captures M frames for every N frames captured by the z sensor, then obviously the mapping becomes more complex. Mapping is further complicated when multiple images are used to generate a single noise-filtered image. Understandably there is no a priori correct way to map a set of RGB images captures at a set of instants-in-time, to a set of z-images captured at some other set of instants-in-time, where sizes of the sets can differ, as can the instants. Thus, the present invention associates timing information with each captured frame, allowing flexibility in the association of z and RGB frames.

Applicants's algorithm preferably, but not necessarily, includes filtering to reduce noise, however such noise filtering may be regarded as optional. The algorithm architecture is flexible such that filtering of image data from either the first or second image stream can be performed with and/or without reference to data from the other stream. As a result, implementing the present invention can result in a three-dimensional model of an imaged scene, having higher x-y resolution than if only the first z-system or z-camera were employed. Advantageously, the amount of resultant increase in z-resolution (e.g., depth resolution) can be tailored to the application at hand, and can equal or even exceed the resolution available from the second RGB-system. It is noted that existing available algorithms can enhance RGB frame resolution above that achievable with native resolution of an RGB sensor chip.

In a preferred embodiment, x-y resolution is selectable, with the best case being a multi-dimensional model whose sample resolution can exceed that of the RGB sensor. The model dimensions preferably include actual spatial dimension (x-y-z), e.g., in mm, color values in RGB (and optionally, alpha), brightness and active brightness measurements, timing information, and a scalar confidence level, representing the probability that a particular point is "correct", e.g., the determined z-value at that point is correct.

If the second, RGB, image stream has a pixel-size of R rows and C columns, the stream of composite RGBZ images is a set S, as follows:

$$S=\{M_T|\{T|t_1,t_2,\ldots,t_n\}\}, \text{where:}$$

$M_T$ is a matrix of R rows and C columns at time t, having elements in the form <x, y, z, c, b, ab, p>

$t_i$ represents preserved timing information.

x, y, and z represent the spatial coordinates.

c represents alpha-inclusive RGB-color at point (x, y, z), b is the brightness value at (x, y, z) up-sampled to R·C from the Z-sensor ab is the active brightness value at (x, y, z) up-sampled to R·C from the Z-sensor, and p represents confidence that the depth of this point is correct, and is an estimation of probability that an inferred spatial value is correct with respect to mappings in the spatial domain.

Figure 9:
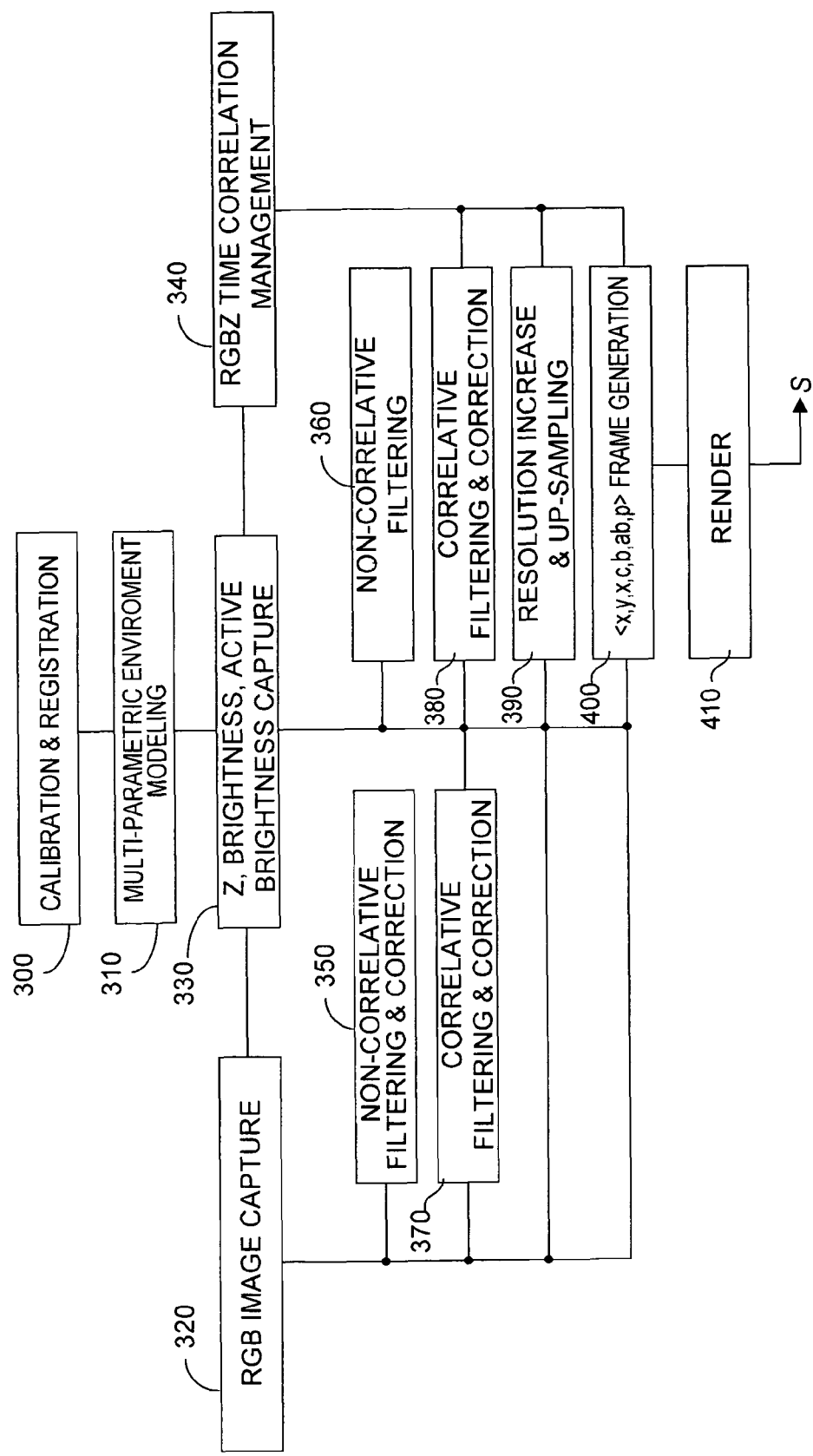
FIG. 9 is a block diagram of an exemplary fusion algorithm, according to an embodiment of the present invention.

FIG. 9 represents the form of a generic fusion algorithm, according to an embodiment of the present invention, where the algorithm output is S. Referring briefly to FIGS. 8A and 8B, software 500 may be stored in memory 72 for execution by processor 70, to carryout the steps to be described with reference to FIG. 9.

At method step 300, calibration and registration of the first and second sensor image data streams is carried out to map corresponding pixels from Z-frames and RGB-frames of acquired data. Typically step 300 involves imaging the same target object, and mapping the pixels from both RGB and Z sensors that image the same point of the target object.

Optionally at method step 310 a static environment model is created using a large number of different Z-sensor settings, and carrying out statistical analysis of a large number of Z-sensor image frames.

At method step 320, the RGB image is captured. At method step 330, Z-values, brightness values, and active brightness values are captured as these values arrive from the respective sensors. At method step 340, correlation of the image data occurs, e.g., by time-stamping captured frames of z-data and RGB data. Such time-stamping can be accomplished in many ways, including use of high frequency counters, perhaps associated with CPU or processor 70, or with real-time counters. Method step 340 then enqueues captured z and RGB image frames in order of arrival, for example using separate queues for noise filtering. It is noted that image enqueuing for noise filters preserves time-ordering, notwithstanding that noise-filtered frames may contain information from multiple frames. The depth, brightness, and active brightness images captured from the z-sensor may share a common time-stamp, or could instead bear unique time-stamps.

At method steps 350, 360, non-correlative filtering follows, where filtering protocol is flexible and preferably is user definable. In general, the type(s) of filtering applied here will tend to differ according to the image type, but no particular constraints need be imposed. In practice, there is little need for any filtering of RGB frames, and most of the filtering computational overhead expended at this phase will be to filter noise for Z data.

At method steps 370, 380 a correlative filtering occurs, wherein pixel data from each image stream type is used to generate a confidence measurement on pixel data from the other stream and, where possible, correction is performed. The architecture of a fusion algorithm accord to the present invention need only assume that the first and second data streams have some mutual reinforcement properties, and that correction of either stream is possible.

At method step 390, up-sampling and resolution increase of Z data is carried out. At step 390, a sparse range map is filled in using information available from the RGB image to make intelligent inferences on implied Z-measurements. If optional step 310 was carried out, the static environment model resulting from step 310 will be used in step 390. A confidence measurement described as p in the n-tuple above is generated as a side-effect of this procedure. As noted above, the p metric concerns accuracy of mappings in the spatial domain and is an estimate of the probability that an inferred spatial value is correct. With respect to method step 390, for each unfilled point in the sparse range map, the algorithm makes some decision as to how to fill-in missing x, y, and z data. If for some reason the missing information cannot be well interpolated or inferred, perhaps noise or lighting conditions make it difficult to estimate well, then a very low confidence metric p will be associated with that point. Conversely, under some conditions it may be possible to infer z data with very high confidence, resulting in a high p metric.

At method step 400, a three-dimension model is then constructed using calibration and registration information obtained in step 300, and using time-correlation data obtained in steps 320-330-340 to select color values to assign at each <x,y,z> coordinate in the high-resolution a data map generated above. The final result of this step is the n-tuple three-dimensional model described earlier herein, a model whose resolution is selectable, but in general will be the highest resolution possible, that of the second, RGB, sensor data.

At method step 410, the resulting model (comprising a single stream of <x,y,z,c,b,ab,p> RGBZ images) can be input to essentially any three-dimensional rendering tool to generate real-time visualizations, shown as output s. Most commonly useful visualizations may include wire frame or mesh models, using only x, y, z, and color data.

Figure 10A:
FIG. 10A depicts an RGB image of an office scene, acquired with a conventional RGB camera, according to the prior art.
Figure 10B:
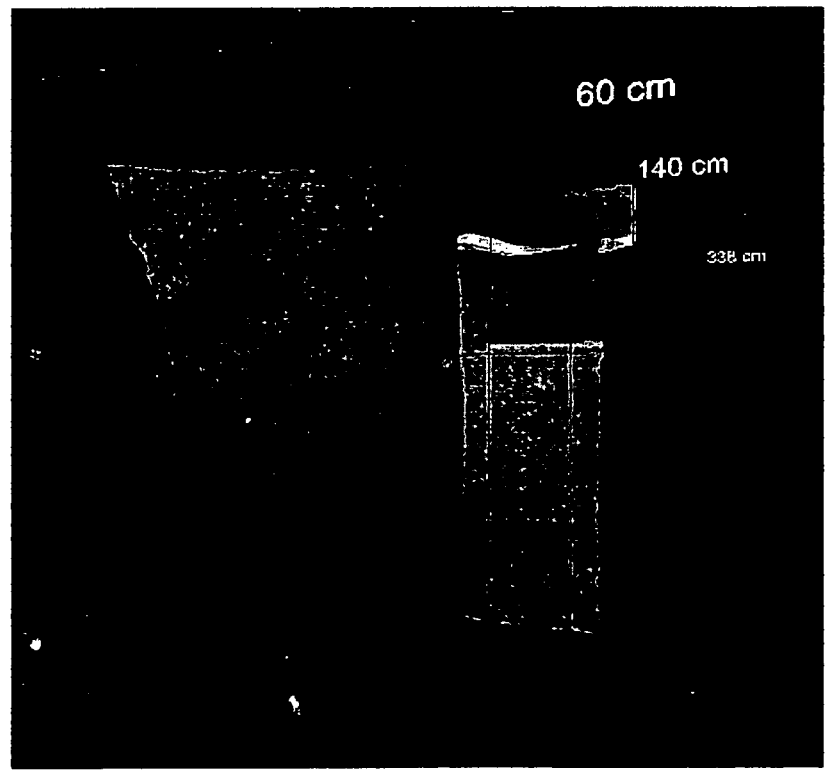
FIG. 10B depicts an RGBZ image of a portion of the scene shown in FIG. 10A, according to an embodiment of the present invention.

FIG. 10A is a conventionally acquired RGB image of an office scene, taken with a Sony cell telephone. As such, the image depicted represents data acquired from a relatively high resolution RGB array, e.g., within the cell telephone camera. A separate z-image (not shown) was also acquired using a z-sensor with 64×64 resolution. FIG. 10B is an RGBZ model of a portion of the same scene, e.g., the filing cabinet region, shown with 320×320 resolution (e.g., at method step 410 in FIG. 9).

Figure 11A:
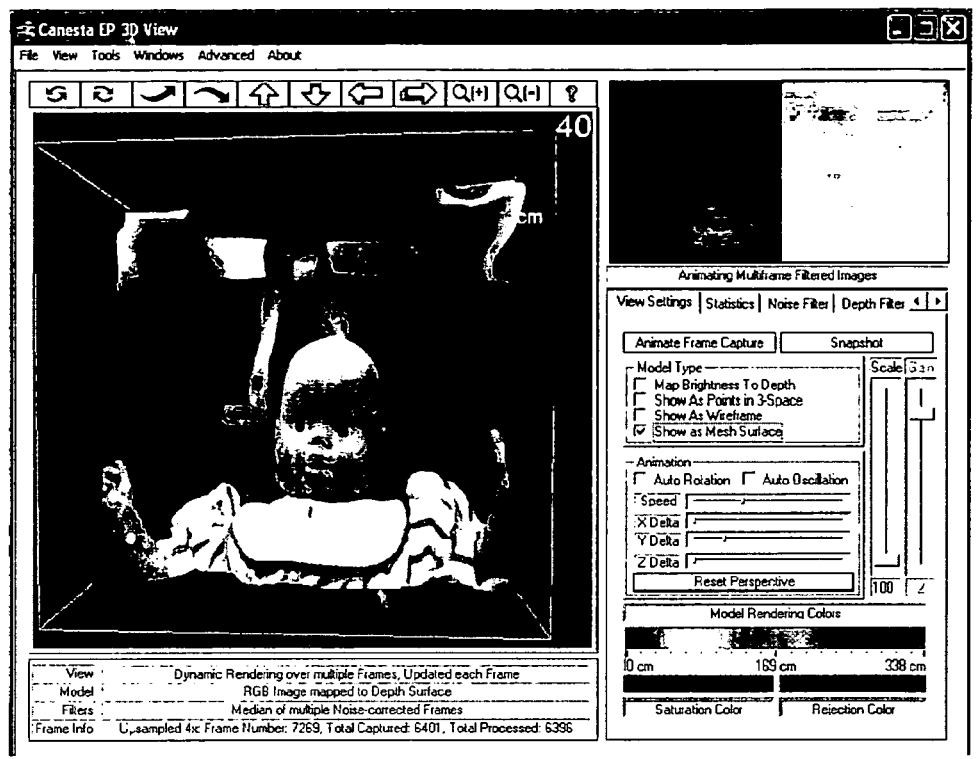
FIGS. 11A, 11B, 11C depict RGBZ images with different up-sampled resolutions, using RGB data mapped to a z-depth surface, according to an embodiment of the present invention.
Figure 11B:
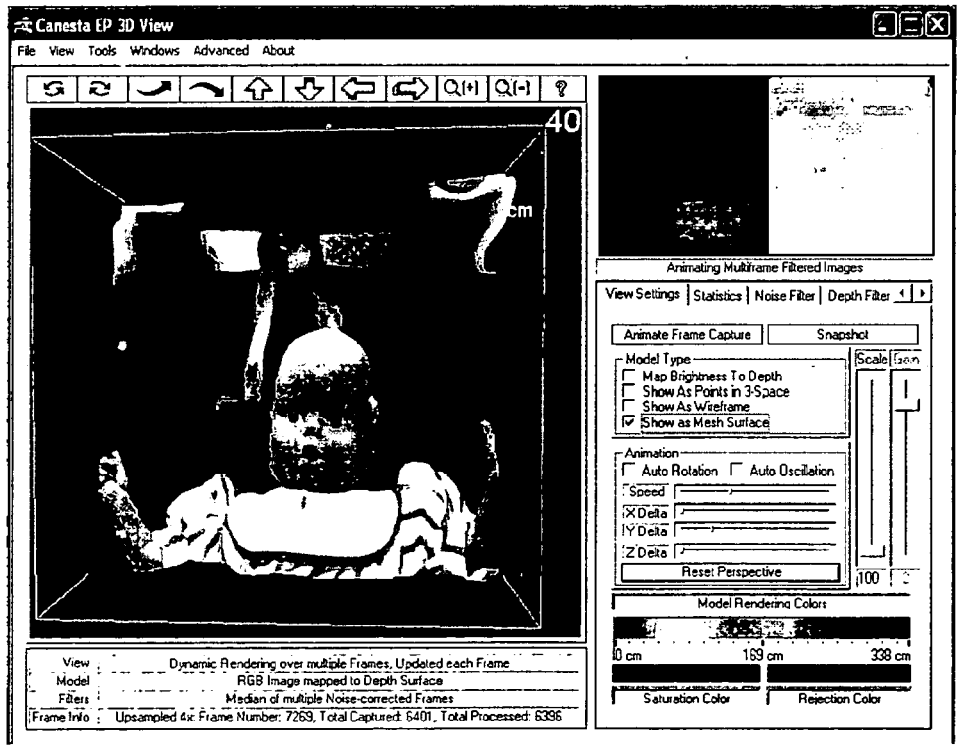
Figure 11C:
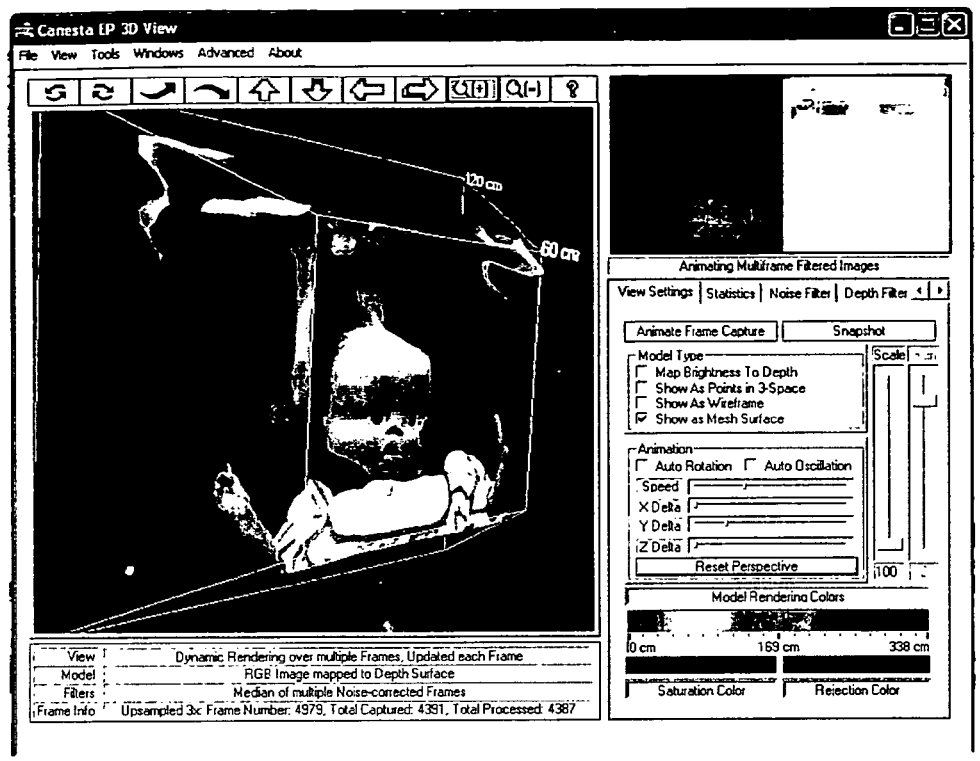

FIG. 11A depicts an RGBZ image acquired from a system according to the present invention, perhaps such as shown in FIG. 8A or 8B. The object imaged with a life-sized baby doll seating in an infant car seat, such as used to transport small children in motor vehicles. The image in FIG. 11A is the result of a depth image acquired from a first array, whose native resolution has been up-sampled by a factor of three using a fusion algorithm according to the present invention, fused with a higher resolution RGB image from a second array. Also shown in the upper right corner of FIG. 11A is a small RGB image (shown in gray scale) and a z-depth image, shown in colors that are mappable to z-depth. FIG. 11B is similar but shows four-time up-sampling of the z-image resolution. FIG. 11C is similar with four-times up-sampling, except that the RGB image is superimposed on the z-depth surface, where the depth image is viewed from one side. Although there is distortion in the RGBZ side view of the infant, the RGBZ image is nonetheless immediately identifiable as an infant.

n rendering three-dimensional models such as shown in FIGS. 10B-11B, a fusion algorithm according to embodiments of the present invention yields a fusion image data stream of matrices $M_T$ having R×C data points, with each element being the <x, y, z, c, b, ab, p> tuple.

According to the present invention, preserved timing information allows any post-processing analytic tools to access discrepancies in the time domain between the z-sensor frame (s) and RGB frame used to construct the fused model. A brief consideration of degenerate cases of frame-rate mismatch between the z-sensors and RGB-sensors will readily demonstrate the need to preserve timing information. For example, assume that the first array of z-sensors delivers data at 50 frames/second (fps), and the second array of RGB sensor delivers data at 1 fps. In this example, all fifty RGBZ model frames will use color information from the same one (RGB) frame, and post-processing analysis of RGBZ data preferably takes this into account. Large timing discrepancies tend to substantially impair modeling accuracy performance in high-motion environments, but have relatively little effect in mostly static environments.

In real-time rendering applications, useful parameters are x, y, z, c, and in some cases p. In some implementations, needless data expansion can be avoided by leaving brightness and active brightness data at the original pixel resolution, and up-sampling points directly from those frames when needed. The p metric is mostly useful when a very high-confidence static model of the environment has been constructed as part of an initialization, e.g., setting up frame queues and noise filters, before image capture begins. (Initiation can also include capturing z-data to construct a static reference model of the environment, to improve noise reduction (see FIG. 9, method step 310). Generally, even in high motion environments <x, y, z> gradients will tend to be smooth for at least one Δx or Δy. In practice, single pixel wide objects are likely to be noise (assuming the object is not extremely close to the sensor), and a low value of p implies increased likelihood that a pixel value is noisy. The present invention seeks to identify and replace noisy pixels with values from neighboring pixels, perhaps associated with higher p, which implies these neighboring pixels are more likely to reflect a correct value. In some case, noisy pixel values may be replaced with values present in the static environmental model. Thus, where <x, y, z> appear to be noisy, the present invention can replace z with the value at <x, y> in the static environment model.

As will now be described, fusion algorithms according to the present invention preferably incorporate a known static environment, and thereby realize improved real-time rendering of non-static environments. If such static model is not present, noise elimination then involves multiple frame techniques to obtain satisfactory performance, in which case, less than satisfactory results of real-time motion are realized. When the imaged scene includes motion that must be rendered in real-time, prior art single frame techniques tend to yield unsatisfactory results due to noise-related distortion.

In general, z-sensors are highly sensitive to noise. In practice, confidence-based depth filtering provides a reliable way to extract useful depth information and substantially eliminate noise from z-sensors. Residual noise not eliminated by such filtering is generally not noticeable when rendered in two dimensions, in which low-confidence data is omitted.

But in the RGBZ environment, even small amounts of noise become quite noticeable and unsatisfactory RGBZ constructions result if one attempts simply to not render low confidence z-measurements. Even less satisfactory results occur if one renders RGB values at a depth that reflects unknown z-values, typically zero depth or maximum depth. Consequently it is preferred to select sensor settings that eliminate the need for depth filtering. While depth filtering per se is not especially time consuming, determining optimum settings for depth filtering is essentially a brute force approach that is time consuming. As noted, according to the present invention, a fusion algorithm preferably includes an initialization phase that automatically iterates over a large number of sensor settings, seeking optimal settings to minimize saturation and rejection. During the searching, data obtained during initialization can advantageously be processed statically to construct an acceptably accurate model of a static environment. Even when automated, this searching process can be time-consuming. However applicants's RGBZ fusion algorithms preferably do not undertake such searching. As noted, when a static model is produced, the model can be referred to where noise and motion are difficult to differentiate.

Figure 12:
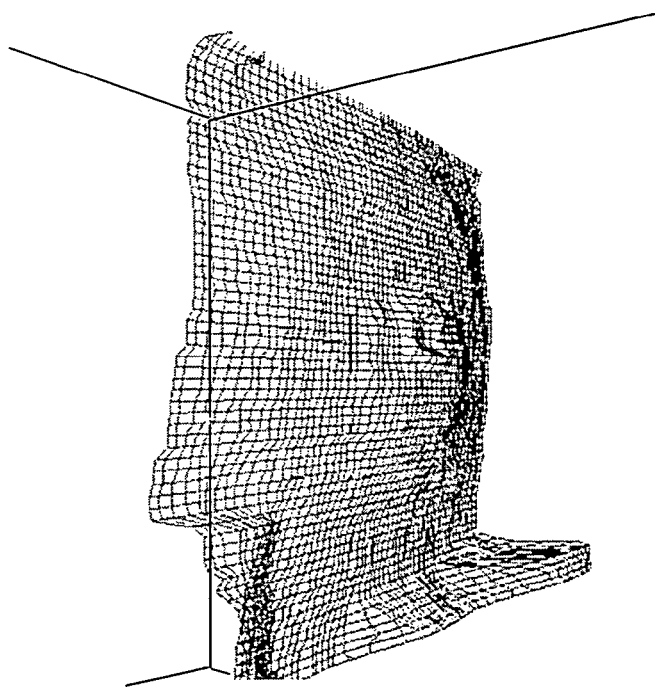
FIG. 12 is a model rendering from a sensor system directed towards a flat wall, according to an embodiment of the present invention.

Consider for example FIG. 12, a rendering of a model, according to the present invention, using the median of 200 noise-filtered data frames, over a few varying sensor settings. An imaging system such as system 540 shown in FIG. 8A or 8B was directed towards a flat wall in a room, to acquire z-data. The actual within-frame standard deviation for the mean and median z represented an error rate of only about 4%. Table 1, below, summarizes the data.

TABLE 1

| | | % error |
|---|---|---|
| Empirical Z (mm) | 939.8 | |
| average stdev (Z) | 8.10 | 0.86 |
| average mean (Z) | 948.24 | 0.90 |
| Average median (Z) | 948.94 | 0.97 |
| frame stdev Z (mean) | 38.49 | 4.09 |
| frame stdev Z (calculated from median depth) | 38.72 | 4.12 |

Up-sampling and noise-correction in a single dimension, according to the present invention, will now be described. Consider for purposes of illustration an interpolative approach involving up-sampling of z-depth data in a single dimension. Let the RGB image R be defined with a single row of M pixels whose red, green, and blue color values are designated R(m), where n is in the range [1 ... M). Consider additionally a single depth frame Z whose dimensions are a single row with N pixels, whose values Z(m) represent distance from the z-sensor plane. Let the range of N to [0,1] be constrained with only two z-values present.

Many approaches to up-sampling are known in the art. The simplest up-sampling techniques increase Z-frame resolution to match R frame resolution and result in a second depth frame $Z_{UP}$ that contains N depth values. In the most basic case, RGB data need not be used (or referenced) in the process of inferring z data until its inclusion in the final model, where it can simply be used to color the resulting model. Assume pixel correspondence is already established such that R(0) →Z(0) and R(M−1)→Z(1). Let Z be up-sampled to create $Z_{UP}$ such that:

(1) $Z_{UP}(0)=Z(0)$
(2) $Z_{UP}(M-1)=Z(1)$
(3) for all m in [1,M−2] $Z_{up}(m)=w_0(m)×Z(0)+w_1(m)×Z(1)$, where $w_0(m)=(m/2M)$ and $w_1(m)=(M-m)/2M$
(4) construct the final RGBZ model such that for all m, R(m)→Z(m).

The above example is a simple linear weighting of depth values. The result is a new $Z_{up}$ image that contains inferred depth values reflecting the slope in the Z domain defined by the original two values in Z, a degenerate case of Lagrange interpolation. The present invention elaborates on this technique to construct a candidate frame $Z_{up}$ using less naïve approaches to inference of interstitial values. According to the present invention, these values are checked and/or corrected, preferably based on information deduced from R.

Figure 13:
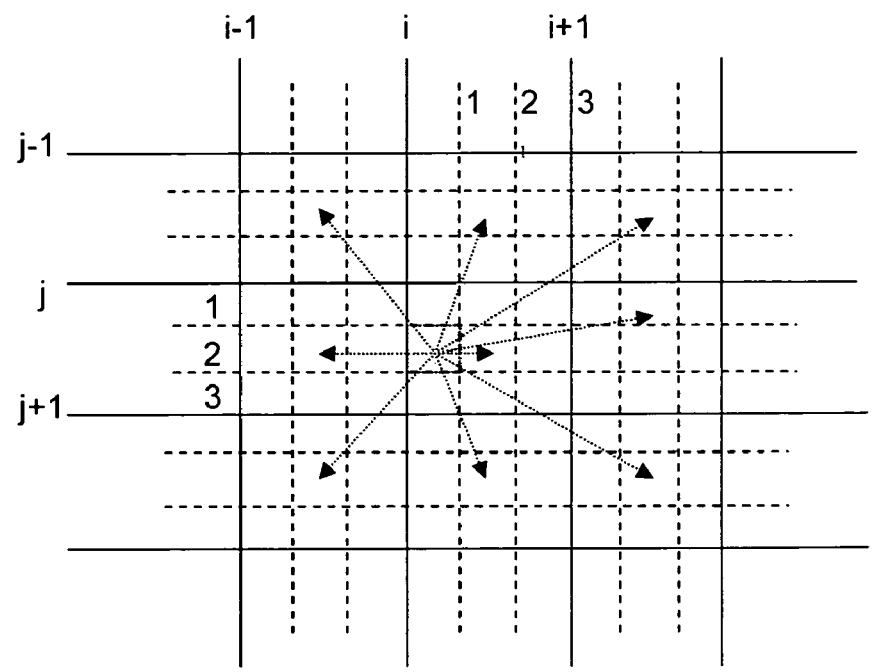
FIG. 13 depicts up-sampling and noise correction in two-dimensions, according to an embodiment of the present invention.

In two dimensions, an interpolative approach according to the present invention may be illustrated as follows with reference to FIG. 13. In FIG. 13, solid lines represent the native x-y grid of a low resolution depth camera, e.g., z-sensor 55 or 130 in FIG. 8A. Dashed lines in FIG. 13 represent the calculated higher resolution upsampled 3× image. Given the measured depth (range) value of the low resolution pixel (solid lines), it is desired to calculate depth data at a given pixel of the higher resolution camera (e.g., dashed lines). Let Z(i,j) be the measured depth value at low resolution pixel i,j. Let $Z(i_m, j_n)$, m=1 . . . 3 and n=1 . . . 3 be the higher resolution pixels mapped to low pixel i,j. Then $$Z(i_m, j_n) = w(i, j) \times Z(i, j) + w(i+1, j) \times Z(i+1, j) +$$
$$w(i+1, j-1) \times Z(i+1, j-1) +$$
$$w(i, j-1) \times Z(i, j-1) + w(i-1, j-1) \times$$
$$Z(i-1, j-1) + w(i-1, j) \times Z(i-1, j) +$$
$$w(i-1, j+1) \times Z(i-1, j+1) +$$
$$w(i, j+1) \times Z(i, j+1) +$$
$$w(i+1, j+1) \times Z(i+1, j+1)$$

According to the above equation, the computed depth value of a high resolution pixel is a weighted average of the measured depth values of its mapped and neighboring pixels. The coefficient values w(.,.) can be obtained in several ways, including (a) determining as a function of distance to each low resolution pixel with higher weight for closer pixels as suggested by the arrows in FIG. 13, (b) determining as a function of the confidence in the measured depth value of each low resolution pixel, with more weight to pixels with higher confidence value, and (c) determining as a function of continuity in the depth and brightness map, with higher value to pixels in the same plane, etc.

Figure 14:
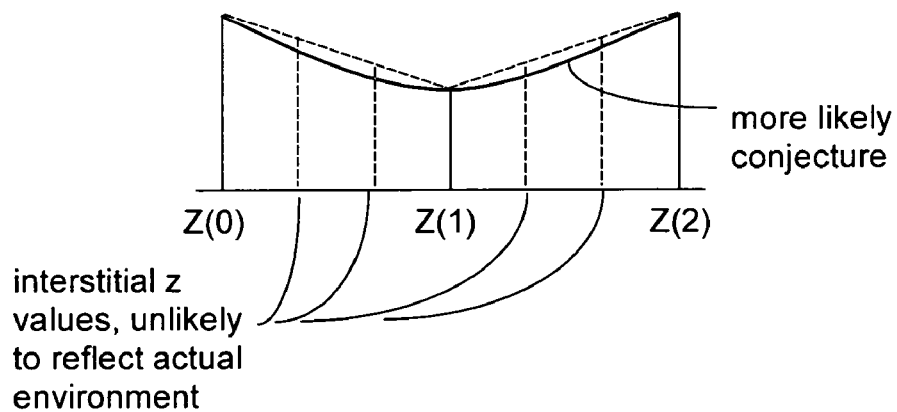
FIG. 14 is a graphical representation showing difficulties associated with linear up-sampling, overcome according to an embodiment of the present invention.

Techniques for determining candidate z-frame construction, according to the present invention will now be described with reference to FIG. 14. Interpolation algorithms are known in the art and can be implemented to an arbitrary level of complexity. As the relevant mathematics are well-explored, let there be defined a generic depth interpolation function, $ZI(z_0, \ldots z_n, \ldots )$. In this function, the ellipsis can represent inclusion of an arbitrary number of known depth samples, and inclusion of multi-dimensional parameters, which map candidate $Z_{up}$ frames at an arbitrary increase in resolution.

Next, define an RGB interpolator function, RI(R, Z, m) that constructs an alternative candidate Z frame $Z_{rgbUP}$, using RGB data as well as known depth values in interpolation of the same interstitial points conjectured by ZI. Algorithms suitable to implement RI are well known in the art.

RGBZ fusion algorithms according to the present invention seek to make intelligent comparison of $Z_{up}$ frames constructed by ZI with $Z_{rgbUP}$ frames constructed by RI. In essence, RGBZ is a function of two conjectured, interpolated frames. One may define a generic function RGBZFuse(Z, Z), where RGBZFuse(ZI, RI) results in a single fused RGBZ frame.

Exemplary implementations for RGBFuse(Z, Z) in a single dimension will now be described. Consider the case where the RGB interpolator function RI and the Z interpolator function ZI have constructed candidate $Z_{up}$ and $Z_{rgbUP}$ frames, each with a single row of N pixels. Again, let pixel correspondence be assumed as described with reference to FIG. 13. To simplify notation, corner cases for N odd or N even will be treated as obvious and will be ignored.

(1) construct $Z_{odd}(N)$ such that $Z_{odd}(n)=Z_{up}(n)$ for all even valued n, $Z_{odd}(n)=Z_{rgbUP}(n)$ for all odd-valued n;

(2) construct $Z_{even}(N)$ such that $Z_{even}(n)=Z_{rgbUP}(n)$ for all even-valued $Z_{even}(n)=Z_{up}(n)$ for all odd-valued n;

(3) construct $Z_{delta}(N)=Z_{even}(n)-Z_{odd}(n)$;

(4) define a matrix of threshold functions $T(Z_{even}, Z_{odd}, Z_{delta}, n)$ that returns $Z_{even}(n)$ or $Z_{odd}(n)$, or an average of the $Z_{even}(n)$ and $Z_{odd}(n)$ weighted by $Z_{delta}(n)$. Note that T can readily note pixel reliability and static environment information collected earlier;

(f) RGBZFuse is the result of pixel-wise application of T to the intermediate frames constructed in steps (1), (2), and (3).

The above-described methodology is exemplary, and myriad modifications may be readily be made. In practice, algorithm success relies upon recognition that where interpolator functions are essentially completely accurate, conjectured z frames should be identical. Good threshold matrices T, or more general approaches to constructing RGBZFuse functions can rely upon empirical patterns of inaccuracy measured for interpolator functions, and upon information inherent in the raw RGB and Z data. The generic algorithms described may be elaborated upon and tailored, for example to harness work done with super-sampling and resolution increase to yield a depth image having a desired resolution increase, with noise reduction as a desired side effect.

Exemplary methods for up-sampling will now be described, by which z data resolution is increased from its baseline pixel-resolution to a higher pixel resolution matching that of the RGB data. For example, increasing 64×64 z frame (or array) size to match the 640×480 VGA pixel-resolution used by a RGB sensor requires the intelligent inference of over 300,000 interstitial data points. At this up-sampled resolution, 98.666% of all rendered points rely on inference.

For example, assume that the above z data has a 5% error rate over the 64×64 samples and that none of the erroneous data is correctable with RGB data. Under these assumptions, the final model that is constructed will include not only the original 204 erroneous z-values (e.g., 5%×64×64), but also inferred z values whose inference relied upon those erroneous values. At up-sample resolution of 640×480, each pixel not on an edge or corner will be used to infer depths in four neighboring regions, each containing about 50 interstitial values. This means that 4×50 or 200 interpolated z values are influenced by each pixel. If 204 pixels are assumed to be erroneous, perhaps due to known error rate, then 204×200 pixels (40.8 Kpixels) may be assumed to have relied upon erroneous value. This means that about 13% of the 640×480 pixels in the resulting model may be assumed to be erroneous. This is not a good result, where 5% represents a conservative starting point estimate. If worst case error is 50%, a 13% error is not very good.

Good results then will be dependent upon z data that is well filtered for noise. Thus a fusion algorithm according to the present invention provides a measure of good noise filtering, as described herein. Assuming well filtered z data, an inference of interstitial points will rely upon examination of data in the corresponding region of the RGB image, in deciding how to select z values. While many approaches may be considered, embodiments of the present invention favor edge-detection interpolation, and gradient-based interpolation.

Edge-detection interpolation will now be described with reference to FIG. 15. Edge-detection based interpolation preferably uses a region map created through edge detection on RGB data. The region map is used to adjust interpolated z values such that they reflect uniformity identifiable within the RGB image data. This interpolation assumes that edges perceptible in the visible spectrum are likely to subdivide interstitial neighborhoods in a candidate up-sampled z frame.

Figure 15:
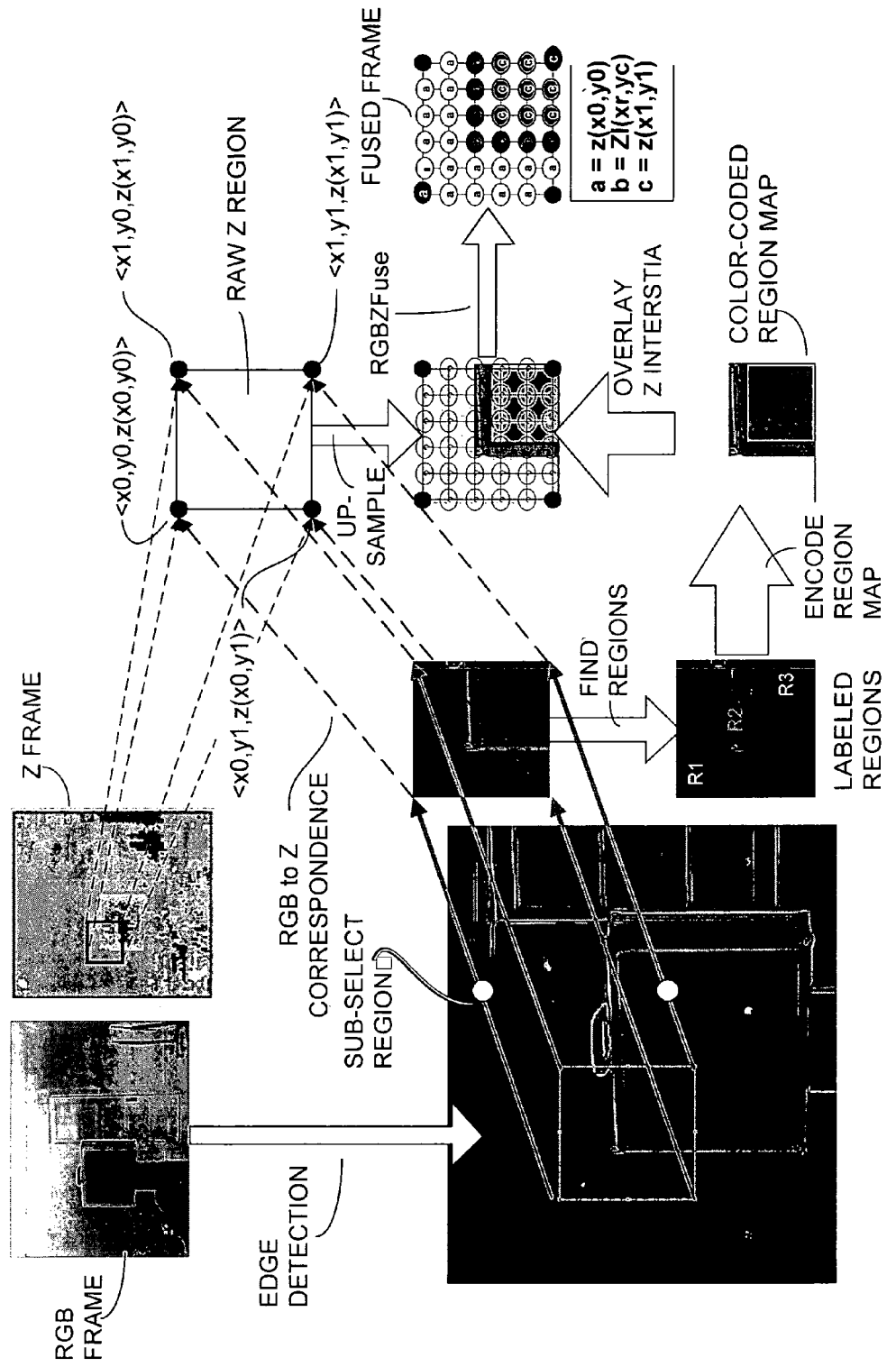
FIG. 15 depicts edge-detection based interpolation, according to an embodiment of the present invention.

FIG. 15 depicts a simple generic method of edge-detection interpolation in which neighboring z-values are discarded in favor of known values from the original z frame. While FIG. 15 demonstrates the edge-preserving characteristic of the method, it will be appreciated that the assumption that all detectable regions in an RGB image correspond to surfaces in three dimensional-space that are orthogonal to the Z-sensor array plane is untrue. The RGB frame at the upper left of FIG. 15 depicts a portion of a suitcase. In FIG. 15, even the edge-detection frame contains sufficient perspective information to reveal that the suitcase in the original image rotated slightly with respect to the y axis. The approach depicted in FIG. 15 preferably is combined with a gradient-based approach described below, such that rotations of this form are preserved. In practice, the lost x and y rotation information inherent in this method is readily compensated for using filtering or weighted averaging of linear interpolations with the above-described fused frames.

Gradient-based interpolation techniques will now be described with reference to FIG. 16 and FIGS. 17A-17F. A gradient-based interpolation attempts a purely mathematical approach to up-sampling. The interpolation uses gradients calculated in RGB and z neighborhoods to detect uniformity in source data, and to enforce similar properties of uniformity in the fused output models.

With reference to FIG. 16 in which pre-interpolation interstitial points are shown, consider an exemplary increase of a 2×2 Z frame to a 6×6 frame. The task is simplified when the RGBZ fixture used is monocular, such that all frame registration and image correspondence of RGB and z frame can be considered to have a linear relationship. If z data are well-filtered, and "assumed" to be correct, a worst case scenario results in selecting z values for interstitial points such that the normal vectors to any two planes defined by these points remain constant in the new higher resolution matrix. In FIG. 16, consider the planes $P_0$, $P_1$, $P_2$, and $P_3$, where:

$P_0 \rightarrow$ defined by <0,0,z(0,0)>, <0,1,z(0,1)>, <1,1,z(1,1)>
$P_1 \rightarrow$ defined by <0,0,z(0,0)>, <0,1,z(1,0)>, <1,1,z(1,1)>
$P_2 \rightarrow$ defined by <0,0,z(0,0)>, <1,0,z(1,0)>, <0,1,z(0,1)>
$P_3 \rightarrow$ defined by <1,0,z(1,0)>, <0,1,z(1,0)>, <1,1,z(1,1)>

Vectors defined as $V_0 \ldots V_3$ normal to $P_0 \ldots P_3$ are readily calculated, which calculation need not be shown here. Preserving invariance on any two of the normal vectors will always be possible, whereas preserving invariance on all four normal vectors will occur only by coincidence.

Consider each quartet of pixels in a z frame to be a "pixel-region". A matrix of normal vectors of this form is created on a per-pixel, per-frame basis, with two vectors per pixel-neighborhood, as described above. This matrix will have members A(i,j) that consist of the variance of the normal vector at pixel (i,j) over some spatial neighborhood, or over some period of time. This approach recognizes that if the normal vector to the model surface changes relatively little from point-to-point, or frame-to-frame, e.g., variance is low in this region map, then there is some continuity or smoothness at the same point being modeled in the real environment. Variance is a useful tool to quantify how much change is occurring, and matrices of the variances of vectors normal to the gradient can easily be constructed, for example using basic statistical methods. A threshold function Tv can then be used to generate a region map that encodes areas of high and low variance of the normal vectors in the original Z data.

A candidate z up-sample frame preferably is generated using Lagrange interpolation. Interstitial Z values will reflect an average a value of all four contributing z values in the raw frame, where the weight of each raw z value is normalized by its linear distance from the interstitial pixel in question.

This same process can also be applied to RGB data, where normal vectors are defined by considering red, green, and blue values to be separate dimensions. A variance frame and corresponding region map can then be created that encodes levels of uniformity within the original RGB data.

The underlying intuition is readily appreciated by considering small regions within an RGB image. A viewer's eye can detect where uniformity is present, and a region map created according to the present invention essentially encodes levels of uniformity as the human eye might perceive them. Consider for example the source RGB image shown in FIG. 17A, and a few associated 5×5 candidate regions, denoted FIGS. 17B-17F.

Each of the RGB 5×5 neighborhood candidates in FIGS. 17B-17B was extracted directly from some part of the RGB frame shown in FIG. 17A, although it is not always obvious from which portion of FIG. 17A the candidates came. Each candidate neighborhood has a qualitative and subjective uniformity that is reflected by the region map described above. Where variance is high, the RGB data are considered to be non-uniform, and the region may be deemed "mostly useless", as shown in FIG. 17B. FIG. 17C appears non-uniform but represents an edge shadow region. FIG. 17D appears to be likely uniform, while FIG. 17E appears mostly uniform, and FIG. 17F is similarly mostly uniform. According to the present invention, using threshold functions on the variance frames will result in a map of regions that have high uniformity, e.g., FIG. 17$f$, to low uniformity, such as FIG. 17B.

Z-interpolation and RGB interpolation functions RI and ZI, and fusion function RGBFuse have been described earlier herein. Consider now the following gradient-based algorithm.

(1) calculate a Z normal vector matrix $NV_m(Z)$, whose members will include two normal vectors per pixel neighborhood;

(2) calculate a z variance frame $V_z(NV_m)$, whose dimensions will be smaller than that of the original Z data and normal vector matrices as variance is calculated over neighboring normal vectors. The corner case is readily handled by assuming very high variance for edge-pixels, and marking them non-uniform in step (3), following;

(3) create a z uniformity region map $Z_{uniformity}(x,y)$, whose dimensions match those of the original Z frame. Encoding uniformity by applying threshold function Tv can have arbitrary levels of granularity, but is well illustrated by considering a binary region map. $Z_{uniformity}(x,y)$ will be 1 where variance is low and the normal vectors indicate uniformity in the Z domain, and 0 where variance is high;

(4) calculate an RGB normal vector matrix $NV_m(RGB)$ similarly to step (1);

(5) calculate an RGB variance frame $V_{rgb}(NV_m(RGB))$, similarly to step (2);

(6) create an RGB uniformity region map $RGB_{uniformity}(x,y)$, similarly to step (3), with the resulting map having dimensions reflecting the original RGB data resolution;

(7) define ZI(Z) to be a simple Lagrange interpolator function;

(8) define RI(Z) to perform step-function interpolation, where interstitial z values in the candidate z frame will take on the raw values of the known z value from the original z frame;

(9) create a candidate up-sample frame $Z_{up}=ZI(Z)$;

(10) create a candidate up-sample frame $Z_{rgbUP}=RI(Z)$;

(11) define RGBFuse($Z_{up}$, $Z_{rgbUP}$) to construct a fused RGBZ Z frame $Z_{result}$ such that:

$Z_{result}(x,y)=Z_{up}(x,y)$, where $Z_{uniformity}(x,y)=1$ $Z_{result}(x,y)=Z_{rgbUP}(x,y)$, where $Z_{uniformity}(x,y)=0$ and $RGB_{uniformity}(x,y)=1$ $Z_{result}(x,y)=average(Z_{up}(x,y), Z_{rgbUP}(x,y))$, where uniformity is not indicated by either region map.

RGBFuse, as implemented above, will take advantage of the smoothness preservation properties of Lagrange interpolators where z data can be detected to have such smoothness, as indicated by the uniformity metric. Edges will tend to be preserved by forcing Z inferences into a plane orthogonal to the z-sensor, where uniformity is detectable in the RGB data.

Figure 18:
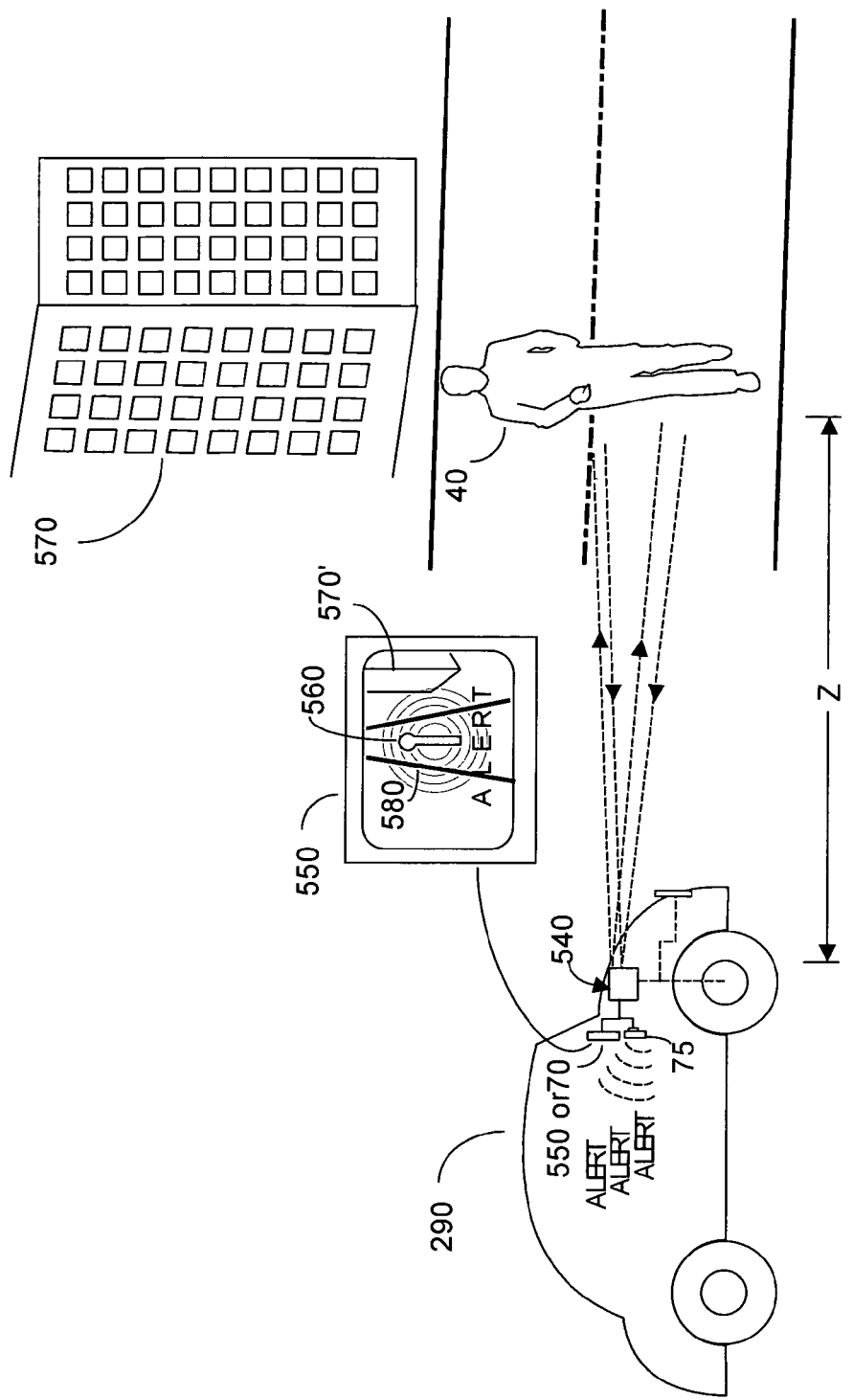
FIG. 18 depicts an object recognition and avoidance application of the present invention, employing GPS input information and a fusion algorithm, according to an embodiment of the present invention.

FIG. 18 is somewhat similar to the application of FIG. 7 except that system 540 includes a fusion algorithm, according to the present invention. As such, system 540 can rapidly an RGBZ image to be viewed on monitor 550, perhaps a monitor that is part of vehicle 290. System 540 can readily ascertain the size and distance z associated with object 40 (using z-data), and can up-sample a depth image using higher resolution RGB data to determine the shape of object 40. The result is that monitor 550 can rapidly present an icon or avatar 560 that the view of the image knows represents a human object, not to be collided with. In the embodiment shown in FIG. 18, system 540 optional includes a GPS system (as shown in FIGS. 8A and 8B). The result is that some of the image shown on monitor 550 can represent output from the GPS unit, e.g., the direction of the road, perhaps large known monuments, shown here as a building 570, which appears (from GPS output) as building object 570' on monitor 550. Other applications of the present invention are also possible.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Those skilled in the art will appreciation that functions of the present invention need not be carried out in software, as described herein. One could instead employ ASICs (application specific integrated circuits) and/or field-programmable gate arrays (FPGA) to perform the various software computations in hardware, taking advantage of the parallelism in the hardware.

Filtering could, for example, be implemented in hardware with filters. Up-sampling could also be hardware implemented, using for example in-pixel computation techniques, known in the art. Such techniques can be applied to implanting up-sampling, where a large z-pixel may include several smaller RGB pixels, where each RGB pixel can be given a z-value, along the lines described in the present invention. Further details as to in-pixel computation may be found in the art, including S. Mehta, R. Etienne-Cummings, "Normal Optical Flow Measurement on a CMOS APS Imager", Proc. of the International Symposium on Circuits and Systems (ISCAS), 2004, Vancouver, May 2004, S. Mehta, R. Etienne-Cummings, "A Focal-Plane Normal Flow Measurement Chip", Submitted to SPIE's Infrared Technology and Applications XXX, April 2004, and S. Mehta, R. Etienne-Cummings, "Normal Optical Flow Chip", Proceedings of the International Symposium on Circuits and Systems (ISCAS), 2003, Bangkok, May 200. Those skilled in the art will recognize that systolic algorithms and architectures can also be used to implement functions of the present invention, for example up-sampling. See for example Chunru Wan, Dept. of Computer Studies, Loughborough Univ., Leicestershire LE11 3TU, UK, "Systolic Algorithms and Applications", at http://www.ntu.edu.sg/home/-ecrwan/Phdthesi.htm.

Other modifications of the described invention are also readily made. For example, and without limitation, other information acquired from an imaged scene that can be determined using known image processing of the RGB image (or sequence of images in time) can be used to guide applicants's up-sampling routine. A spatial variation in the color, shading or texture of the scene can indicate changes in the depth planes and surfaces representing the object segments in the scene. The up-sampling routine can use the low resolution depth data of these segments to create high resolution depth data that is accurately bounded by the edges of the objects in the high resolution RGB frame. Furthermore, prior knowledge of the general shape of the objects in the scene can be used by the up-sampling routine to produce high resolution depth surfaces. For instance, assume that a basketball is present or detected in the scene. In this example, the up-sampling routine can fit the shape of a sphere on the ball using low resolution depth data from the ball to produce a detailed three-dimensional image of the ball.

By way of further example, assume an RGBZ camera is mounted on or in a vehicle, to image the road ahead or behind, as suggested by FIG. 18. Since roadways are typically planar surfaces, a plane can be fitted to the road using data from the low resolution Z sensor (or camera). The plane (i.e., the road) can then be segmented precisely using the image acquired from the higher resolution RGB sensor (or camera). Such a model of the road can readily detect objects that rise above the road, for example an obstacle in the direction of the motion of the vehicle.

It is to be understood that the embodiments were chosen and described to best explain the principles of the invention and its practical application, and to thereby enable others skilled in the art to best utilize the invention and various embodiments with various modifications as are suited to the particular use contemplated. It is intended that the scope of the invention be defined by the claims appended hereto and their equivalents.

What is claimed is:

1. For use with a sensor system that includes first sensors to acquire from a scene z-depth values and brightness data values at a first resolution, each of said first sensors occupying a first sensor area, and second sensors to acquire from said scene RGB data values at a higher second resolution, each of said second sensors occupying a second sensor area, said first and second sensors acquiring data values substantially simultaneously, a method to combine data values acquired by said first sensors with data values acquired by said second sensors such that an RGBZ image may be rendered whose resolution is higher than said first resolution, the method including the following steps:

(a) dynamically correlating data values acquired by said first sensors and data values acquired by said second sensors such that depth data computed for a higher resolution pixel are affected by data values from said second sensors; and (b) up-sampling and increasing resolution of data values acquired by said first sensors such that an RGBZ model may be rendered from data values so up-sampled and increased in resolution, resolution of said RGBZ model exceeding said first resolution of said first sensors.

2. The method of claim 1, wherein said first sensors have a characteristic selected from a group consisting of (i) said first sensors are fabricated on a common integrated circuit array as said second sensors, (ii) said first sensors are fabricated on an integrated circuit array discrete from an integrated circuit array that includes said second sensors, and (iii) said first sensor area is greater than said second sensor area.

3. The method of claim 1, further including, intermediate step (a) and step (b), a step of filtering data values acquired by at least one of said first sensors and said second sensors.

4. The method of claim 1, where step (a) includes mapping a relationship between data values acquired by said first sensors and data values acquired by said second sensors, said mapping having a relationship selected from a group consisting of (i) one-to-one, (ii) one-to-many, and (iii) many-to-one.

5. The method of claim 1, wherein step (a) includes calibration and registration of data values acquired by said first sensors and data values acquired by said second sensors, such that pixels associated with said first sensors that image a point on a target are mapped with pixels associated with said second sensors that image said same point on said target.

6. The method of claim 1, wherein step (a) further includes capturing from said first sensors depth z values, brightness, active brightness values, and capturing from said second sensors RGB data values, substantially simultaneously in real-time.

7. The method of claim 3, wherein said step of filtering data values includes at least one of (i) non-correlative filtering, (ii) non-correlative filtering and correction, (iii) correlative filtering, and (iv) correlative filtering and correction;
wherein correlative filtering includes using data values from said first sensors to generate a measure of confidence on data values from said second sensors, and vice versa.

8. The method of claim 3, where said step of filtering data values includes a filtering characteristic selected from a group consisting of (i) filtering data values acquired by said first sensors is carried out independently of filtering data values acquired by said second sensors, and (ii) filtering data values acquired by said first sensors is carried out with reference to filtering data values acquired by said second sensors.

9. The method of claim 1, wherein at step (b), said RGBZ model is characterized by at least one of (I) parameters including at least three of (i) actual (x,y,z) spatial dimension values, (ii) RGB color values, (iii) brightness values, and (iv) active brightness values, and (II) said RGBZ model is representable by a fusion image data stream of matrices $M_T$ having R×C data value points, where each matrix element includes at least spatial data values in three dimensions (x,y,z), brightness values, active brightness values, and a confidence metric p that estimates probability that any inferred spatial data values are substantially correct.

10. The method of claim 1, wherein step (b) includes at least one of (i) creating a sparse range-z map that is filled-in using data values from said second sensors, to make logical inferences upon implied z-measurements, (ii) an interpolation process including edge-based detection, (iii) an interpolation process including gradient-based detection, (iv) an interpolation process including threshold testing, and (v) a Lagrange interpolation.

11. A time-of-flight system that acquires z-depth values, brightness values, and RGB information values and outputs data values from which an RGBZ image may be rendered, the time-of-flight system including:
a plurality of first sensors to acquire from a scene z-depth values and brightness data values at a first resolution, each of said first sensors occupying a first sensor area;
a plurality of second sensors to acquire from said scene RGB data values at a higher second resolution, each of said second sensors occupying a second sensor area, said first and second sensors acquiring data values substantially simultaneously, said first sensors having a characteristic selected from a group consisting of (i) said first sensors are fabricated on a common integrated circuit array as said second sensors, (ii) said first sensors are fabricated on an integrated circuit array discrete from an integrated circuit array that includes said second sensors, and (iii) said first sensor area is greater than said second sensor area, and further including:
means for dynamically correlating data values acquired by said first sensors with data values acquired by said second sensors such that said RGBZ image may be rendered whose resolution is higher than said first resolution, in which RGB image data values from said second sensors affect depth data of a higher resolution pixel that is computed based on data values of said first sensor.

12. The system of claim 11, further including means for filtering data values acquired by at least one of said first sensors and said second sensors.

13. The system of claim 11, wherein said means for dynamically correlating includes:
means for correlating timing information with data values acquired by said first sensors and with data values acquired by said second sensors; and
means for up-sampling and increasing resolution of data values acquired by said first sensors to a resolution not required to be bounded by said second resolution, such that an RGBZ model may be rendered from data values so up-sampled and increased in resolution.

14. The system of claim 11, wherein said means for dynamically correlating includes a software routine that upon execution by a processor carries out said combining.

15. The system of claim 13, wherein said means for correlating timing information functions with a mapping relationship between data values acquired by said first sensors and data values acquired by said second sensors, said mapping relationship having a characteristic selected from a group consisting of (i) one-to-one, (ii) one-to-many, and (iii) many-to-one.

16. The system of claim 13, wherein said means for correlating timing information has at least one characteristic selected from a group consisting of (i) said means for correlating timing information carries out calibration and registration of data values acquired by said first sensors and data values acquired by said second sensors such that pixels associated with said first sensors that image a point on a target are mapped with pixels associated with said second sensors that image said same point on said target, and (ii) said means for correlating timing information captures from said first sensors depth z values, brightness values, active brightness values, and captures from said second sensors RGB data values, substantially simultaneously in real-time.

17. The system of claim 12, wherein said means for filtering data values includes at least one of (i) non-correlative filtering, (ii) non-correlative filter and correction, (iii) correlative filtering, and (iv) correlative filtering and correction;
wherein correlative filtering includes using data values from said first sensors to generate a measure of confidence on data values from said second sensors, and vice versa.

18. The system of claim 12, where said means for filtering data values has a characteristic selected from a group consisting of selected from a group consisting of (i) filtering data values acquired by said first sensors is carried out independently of filtering data values acquired by said second sensors, and (ii) filtering data values acquired by said first sensors is carried out with reference to filtering data values acquired by said second sensors.

19. The system of claim 13, wherein said RGBZ model obtainable from said means for up-sampling and increasing resolution is characterized by at least one of (I) parameters including at least three of (i) actual (x,y,z) spatial dimension values, (ii) RGB color values, (iii) brightness values, and (iv) active brightness values, and (II) said RGBZ model is representable by a fusion image data stream of matrices $M_T$ having R×C data value points, where each matrix element includes at least spatial data in three dimensions (x,y,z), brightness values, active brightness values, and a confidence metric p that estimates probability that any inferred spatial data values are substantially correct.

20. The system of claim 13, wherein said means for up-sampling and increasing resolution has at least one characteristic selected from a group consisting of (I) said means for up-sampling and increasing resolution creates a sparse range-z map that is filled-in using data values from said second sensors, to make logical inferences upon implied z-measurements, and (II) said means for up-sampling and increasing resolution implements at least one type of interpolation selected from a group consisting of (i) edge-based detection, (ii) gradient-based detection, (iii) threshold testing, and (iv) Lagrange interpolation.

* * * * *